(12) United States Patent
Reynolds

(10) Patent No.: US 7,670,093 B2
(45) Date of Patent: Mar. 2, 2010

(54) NON-PRISMATIC GROOVED SHANK FASTENER

(76) Inventor: Zachary M. Reynolds, 360 Gossage Ave., Petaluma, CA (US) 94952

( * ) Notice: Subject to any disclaimer, the term of this patent is extended or adjusted under 35 U.S.C. 154(b) by 114 days.

(21) Appl. No.: 11/651,781

(22) Filed: Jan. 11, 2007

(65) Prior Publication Data
US 2007/0160442 A1 Jul. 12, 2007

Related U.S. Application Data

(60) Provisional application No. 60/758,631, filed on Jan. 12, 2006.

(51) Int. Cl.
*F16B 15/08* (2006.01)
(52) U.S. Cl. .................... 411/452; 411/451.4
(58) Field of Classification Search ............... 411/452, 411/451.4, 446, 491, 922, 451.5
See application file for complete search history.

(56) References Cited

U.S. PATENT DOCUMENTS

| | | | |
|---|---|---|---|
| 456,723 A * | 7/1891 | Harvey | 411/452 |
| 1,380,423 A * | 6/1921 | Sessler | 411/453 |
| 2,014,746 A * | 9/1935 | Robergel | 470/34 |
| 2,256,401 A * | 9/1941 | Maze | 411/454 |
| 3,977,398 A | 8/1976 | Burstein | |
| 4,011,785 A | 3/1977 | Schrepferman | |
| 4,037,512 A | 7/1977 | Sundberg | |
| 4,263,830 A | 4/1981 | Burstrom | |
| 4,637,768 A | 1/1987 | Rabe | |
| 4,755,091 A | 7/1988 | Potucek et al. | |
| 4,781,508 A | 11/1988 | Schroeder et al. | |
| 4,815,910 A | 3/1989 | Potucek | |
| 4,823,978 A * | 4/1989 | Pufpaff | 220/787 |
| 4,973,211 A | 11/1990 | Potucek | |
| 5,143,501 A | 9/1992 | Leistner et al. | |
| 5,511,918 A | 4/1996 | Rotter | |
| 5,785,478 A | 7/1998 | Rotter | |
| 6,511,252 B1 * | 1/2003 | Andros | 403/283 |
| 6,805,525 B2 | 10/2004 | Oswald | |
| 7,097,403 B1 | 8/2006 | Seace | |

* cited by examiner

*Primary Examiner*—Gary Estremsky

(57) ABSTRACT

Non-prismatic shank fasteners, such as nails, for wood and similar soft materials have a plurality of longitudinal extending non-congruent sections having different geometries, different configurations, and varying diameters such that the shank has the widest nominal diameter arranged to span a joint between wood members being fastened. The shank has four circumferentially symmetrically disposed grooves and ridges having dimensions within pre-determined ranges such that the ridges have sufficient strength to withstand the forces imposed on the shank being driven into the parent material and to resist loads imposed upon them by the loads to the parent material. The grooves have a sufficiently wide jaw opening to allow elastically compressed parent material to enter the groove and provide support to the shank. The non-prismatic grooved shanks demonstrate significantly greater load handling capability than that possessed by other known types of fasteners.

16 Claims, 13 Drawing Sheets

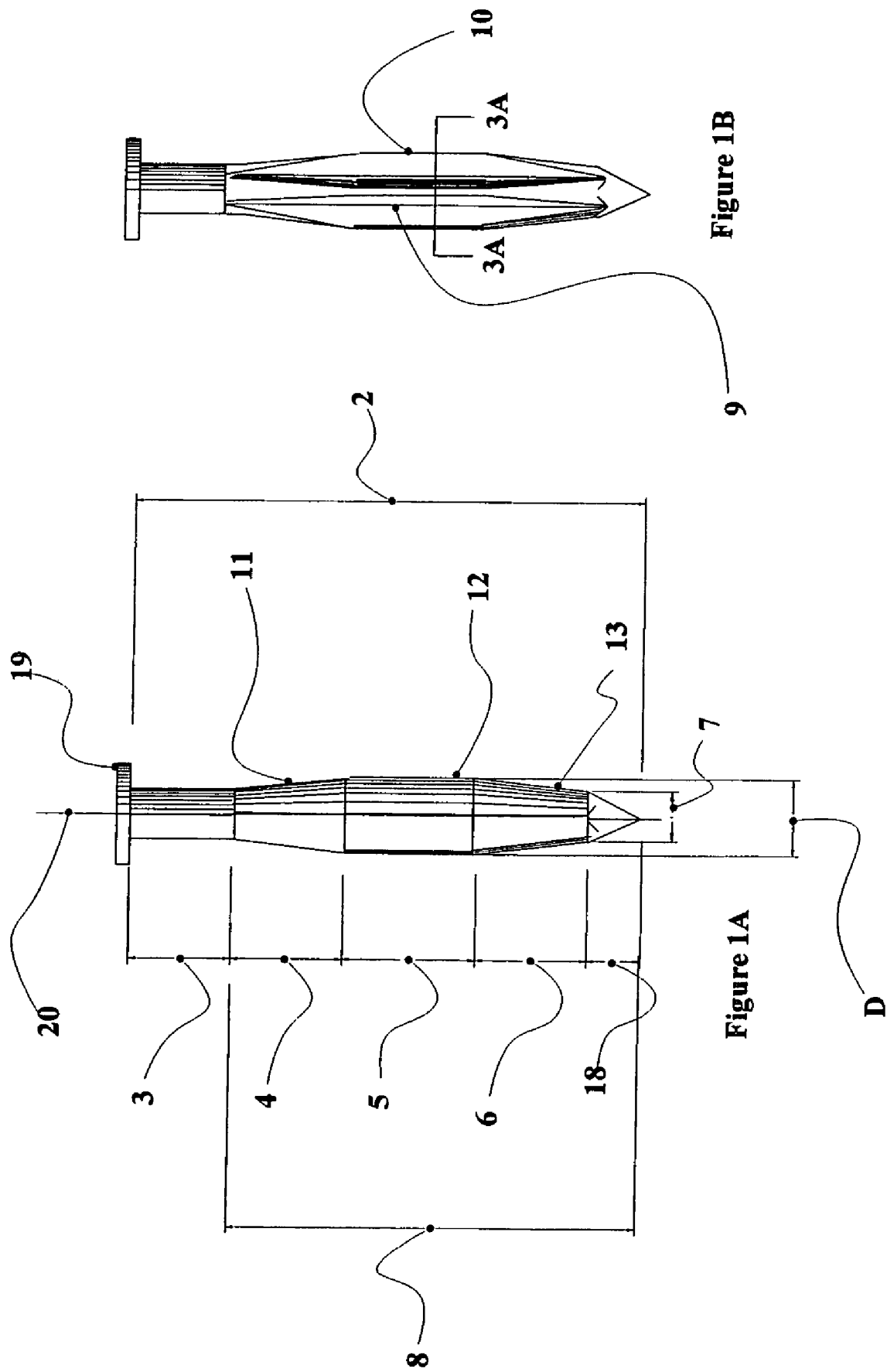

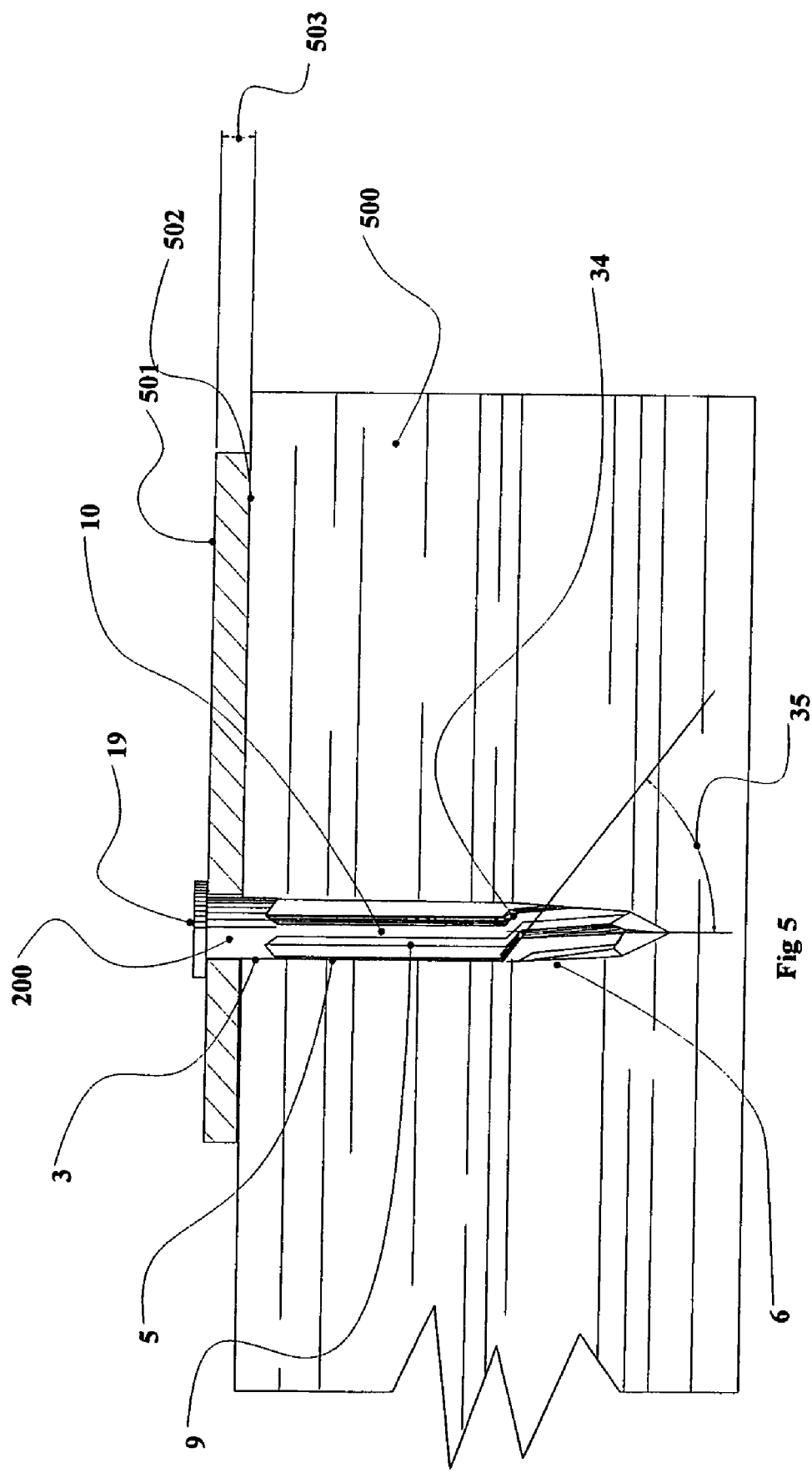

NON-PRISMATIC GROOVED SHANK FASTENER

CROSS REFERENCE TO RELATED APPLICATIONS

This application claims the benefit of U.S. provisional Application No. 60/758,631, filed Jan. 12, 2006.

BACKGROUND OF THE INVENTION

This invention relates generally to fasteners for relatively soft materials with elastic-plastic properties, such as wood and wood products, and more particularly to fasteners such as nails for creating joints in wood.

Typical fasteners used in soft materials with plastic-elastic properties, such as wood and wood products, involve forcing or screwing the fastener into the material, and create a joint bond through friction and interlocking between the fastener and the parent material. A widely used fastener for wood is a common round cylindrically shaped nail. A nail, spike, or other similar type of forced fastener is typically a device of relatively uniform geometric proportions having an elongated shank with a head and a pointed end. Commonly, the shank is cylindrically shaped and distinguished by parallel sides and substantially unvarying congruent cross section over its full length. The term "congruent" means that cross sections taken at different points along the shank length are substantially identical in form and fit one within the outline of the other. The shank, which is driven into a parent material, causes a portion of the material to compress plastically as it expands and creates a space that conforms to the shank. The compressed material deforms into the surrounding material, causing the surrounding material to be compressed elastically and to exert pressure on the fastener shank. The term "plastic deformation" refers to a deformation that is substantially permanent and irreversible, whereas the term "elastic" refers to a characteristic of material that has elasticity and tends to return to its original form when a stress is removed. In the case of a fastener shank that is driven into wood, there is a plastic deformation of the wood material caused by the shank that is irreversible, and a hole is left in the material as though it were drilled.

Where the shank plastically deforms the parent material, the displaced material around the shank is placed in compression and acts to grip the shank, exerting friction and resistance to lateral movement, or wobble, of the shank in the formed hole. Although the permanent deformation of the material is intrinsically weakening, some deformation is essential to forming a friction bond with the shank.

As the shank of the fastener accepts load, either transverse or parallel to the longitudinal axis of the shank, both the shank and the parent material in the vicinity of the shank experience an initial reaction that is elastic (up to a given load), meaning that when the load is removed the shank will return to its original configuration in the parent material. The hardness and elastic modulus of the typical fastener used for soft materials, such as wood, are generally greater than that of the parent material since the fastener is nearly always driven into the parent material and must create its own entry hole. The elastic range of the joint, where stress and strain are approximately proportional, is influenced by the elastic modulus of the weaker element (the wood or other parent material) and the local unit stress. Unit stress is determined by the area of the parent material affected, so that the greater the area for a given load the less the unit stress. For example, in the case of a fastener, the area may be the width or the diameter of the shank over a unit of shank length.

The holding power of fasteners such as nails is generally assumed to be a function primarily of the friction between the fastener and the parent material, and it is assumed that holding power increases with the depth of penetration of the fastener beyond a joint interface. This is usually expressed as a depth of penetration of the point in the joint component receiving the point, and is a designation determined by standard testing criteria. In practice, this turns out to be approximately a distance of eleven shank diameters from the joint. Thus, the traditional approach places emphasis upon the length of the shank as the shank acts like a beam developing end moments. However, there is a point where greater penetration does not produce greater holding power, and holding power is unaffected by penetration of the shank beyond that point. The most commonly used fasteners have bases or sides that are essentially parallel or developed along parallel planes, and form a generally prismatic section. These prismatic shapes, which are generally uniform in cross section, exhibit a uniform strength and resistance to bending over the length of the shank.

Common round cylindrical wire nails have several well-known disadvantages. They are wasteful of fastener material, e.g., steel, and use an excess amount of fastener material for the amount of holding power they afford. A round cylindrical nail has the smallest surface area for the given amount of fastener material used, which increases the cost of the nail, and this geometry impacts its effectiveness because of the lack of complete frictional contact between the shank and the material. The common round nail also has a tendency to wedge the wood apart (and may sometimes split the wood) which decreases the holding power by reducing the amount of surface area of the nail which is in contact with the wood. Furthermore, as parent material is irreversibly crushed and fails plastically, a fastener is deprived of support along its length and is subjected to increased bending strain. Both the fastener and the parent material may eventually experience plastic failure, which progresses until the joint separates in ultimate failure. Various approaches have been used to extend the range of elastic or quasi-elastic behavior between the fastener and the parent material. These include hardening the shank, roughening and ribbing a shank, using square shanks, bent shanks, crimped ends, cold riveted spikes, expanding collars and deformed shanks. Other methods have included "setting" the shank, after introduction into material, by further deforming it into the material as by expanding or crimping.

Some approaches to avoid the disadvantages of the round cylindrical nail have included fabricating the shank with grooves and ridges, such as annular grooves or fins that project radially outward from the shank. These ridges and fins have as their purpose increasing the withdrawal force required to remove the shank from the wood by embedding themselves into the wood transversely to the axis of the shank. Still other approaches have included fabricating the shank with a plurality of longitudinal fins that project radially from the shank to impart to the shank a finned or ridged cross section as shown, for example, in U.S. Pat. No. 7,089,403 to Seace or the star-shaped cross section shown in U.S. Pat. No. 4,973,211 to Potucek, or to give the shank a Y-shaped or cross-shaped cross section such as shown in U.S. Pat. No. 5,143,501 to Leistner and U.S. Pat. No. 4,637,768 to Rabe. The purpose of such projecting ridges and fins is either to reduce the amount of fastener material used relative to a common cylindrical nail, or increase holding power by increasing the amount of surface area of contact between the shank and the parent material. However, such known shanks having fins or ridges and grooves have not been effective in affording increased joint strength or reducing the size of the fastener.

For instance, the five-pointed star fastener of Potucek has relatively thin fins that press into distorted and crushed wood fibers. They are unsupported by the wood and function as weak cantilevers which are likely to deform under pressure. Although this fastener has a moment of inertia and section modulus that are greater than a conventional cylindrical fastener, the fins are structurally weak and relatively poor in transmitting loads to the overall structure. They are likely to fail or distort individually and undermine the shank as a structure in a manner similar to flange instability on a non-compact girder.

In other arrangements, such as the four grooved cross configuration of Leistner, increased holding power is stated to be the result of increasing the shank diameter by deforming the shank to produce the projecting ridges. The ridges of the Leistner fastener have a peripheral surface that is greater than 38% and may be as high as 50% of the increased circumference of the shank, and Leistner teaches that to obtain the increased holding power the shank should be inserted with the ridges transversely across the grain of the wood. The y-shaped configuration of Rabe must also be aligned with the grain of the wood. These fasteners which require some form of alignment of the shank with the material are impractical.

It is desirable to provide fasteners and wood products that afford greater holding power for a given shank diameter and length, which efficiently utilize shank material in a cost effective manner, which can easily withstand the load of being driven into wood and similar materials, and which does not require any particular alignment of the fastener with the grain of the wood material. It is desirable to provide a fastener which satisfies these criteria and which overcome other disadvantages of known fasteners, and it is to these ends that the present invention is directed.

SUMMARY OF THE INVENTION

The invention takes a wholly different approach from that taken by known fasteners, and is grounded upon very different principles and concepts from the prior art. The invention is based upon a new and better understanding of the interaction of an elastic-plastic soft material, such as wood or wood products, with a fastener such as a nail, where the fastener has material properties that exceed the parent material being fastened. The invention employs this improved understanding to provide a fastener having a geometry and shank configuration that is optimized to achieve substantially better combined lateral and axial (or longitudinal) holding power over that of a conventional cylindrical shank and other known configurations, while avoiding the drawbacks of otherwise complex shapes and configurations which are impractical or afford reduced strength or function.

In contrast to known approaches that view distortion and deformation to be important in establishing the holding power of the fastener, it has been found in accordance with the invention that holding power is instead dependent upon minimizing distortion and deformation, and the invention instead seeks to maximize elastic compression of the parent material. The geometry of the grooved shank of the invention and the configuration and arrangement of grooves and ridges minimize parent material distortion by allowing the displaced material to maintain contact with the shank with a minimum of plastic deformation.

In one aspect, the invention affords a fastener for joining first and second members that comprises a head, a pointed tip section, and an elongated non-prismatic shank extending between the head and the pointed tip region. The shank comprises several different sections, including a cylindrical section adjacent to the head that has a first diameter, a midsection that has a diameter greater than the first diameter, a first tapered section located between the cylindrical section and the midsection, and a second tapered section located between the midsection and the tip section. The fastener has a length such that when used to join the first and second members, the larger diameter midsection spans a joint between the members.

In another aspect, the invention provides a fastener that comprises a head, a pointed tip section and an elongated non-prismatic shank extending between the head and the pointed tip section. The shank comprises a cylindrical section adjacent to the head which has a first diameter, a midsection with a second diameter greater than the first diameter, a first tapered section between the cylindrical section and the midsection, and a second tapered section between the midsection and the tip section. The midsection and the first and second tapered sections have four longitudinally extending grooves disposed circumferentially symmetrically about the shank. Each groove has tapered sides that form a radially projecting ridge between adjacent grooves.

More specifically, the grooves form a jaw opening in the angular range of the order of 105 to 145 degrees, and the tapered sides of each groove have a slope in the range of the order of 9 to 26 degrees measured with respect to a principal transverse radial axis of the fastener. The ridges have a peripheral ridge surface in the range of the order of 15% to 38% of the circumference of the shank. In a more specific aspect, the ridge tips have a circumferential length of the order of 0.12D to 0.3D, where D is the maximum diameter (or width) of the shank in the midsection as measured between ridge tips of opposing ridges.

In yet another aspect, the invention affords a fastener comprising a head, a pointed tip section and an elongated non-prismatic shank extending between the head and the pointed tip section. The shank has four longitudinally extending grooves and ridges, and a transverse cruciform cross section comprising a central core and four radial projections disposed circumferentially symmetrically about the core to form the grooves and ridges. The central core has a diameter of the order of 0.59D, where D is the diameter of the shank at the tips of the ridges. The ridges have a peripheral ridge tip with a circumferential length in the range of the order of 0.12D to 0.3D. More particularly, the ridges have ridge tip surfaces in the range of the order of 15% to 38% of the circumference of the shank.

In a further aspect, the invention provides a fastener comprising a head, a pointed tip section, and an elongated non-prismatic shank extending between the head and the pointed tip section. The shank has a cylindrical section adjacent to the head, a midsection, and a tapered lower section, and has four longitudinally extending grooves and ridges and a transverse cruciform cross section comprising a central core and four longitudinally extending radial projections. The projections are disposed circumferentially symmetrically about the core to form the grooves and the ridges, and the shank has a tapered lower section between the midsection and the pointed tip where the lower section is twisted relative to the midsection about a longitudinal axis of the shank such that the ridges form shoulders at a junction between the midsection and the lower section to afford greater axial load carrying ability.

BRIEF DESCRIPTION OF THE DRAWINGS

FIGS. 1A and 1B illustrate fasteners in accordance with the invention having a non-prismatic shank, FIG. 1A illustrating a first embodiment of the invention comprising a non-grooved, non-prismatic shank, and FIG. 1B illustrating another embodiment of the invention comprising a fastener having a similar shank configuration to that of FIG. 1A with longitudinally extending grooves and ridges;

FIG. 5 is a side elevational view of a cut-away section illustrating the fastener of FIG. 4B in a joint for joining a faceplate with a base member;

DESCRIPTION OF THE PREFERRED EMBODIMENTS

Figure 2B:
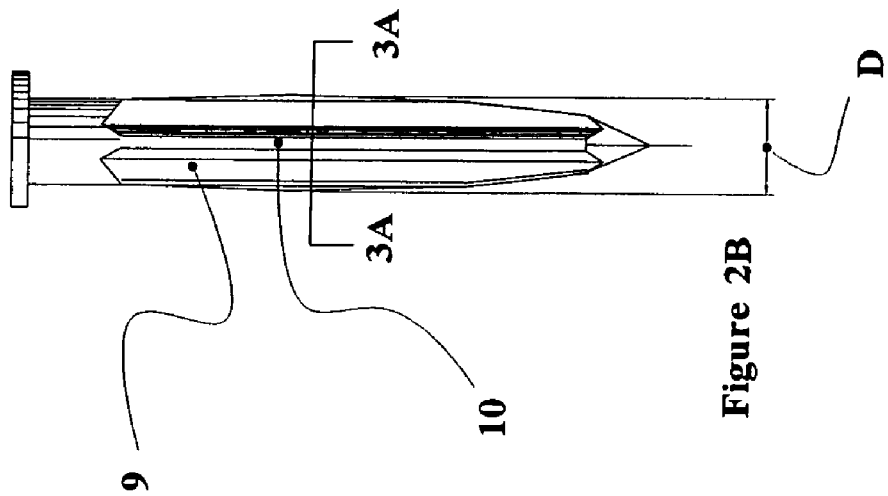
FIGS. 2A and 2B respectively illustrate non-grooved and grooved non-prismatic shank fasteners in accordance with third and fourth embodiments of the invention.

The invention provides fasteners which are particularly well-adapted for joining soft materials with elastic-plastic properties, such as wood and wood products, and will be described in that context. As will become apparent, however, this is illustrative of only one utility of the invention and it will be appreciated that the principles underlying the invention are applicable to other types of fasteners and to other types of materials.

FIGS. 1A and 1B respectively illustrate first and second embodiments of a non-prismatic fastener in accordance with the invention, the two fasteners having substantially the same overall shank geometry and dimensions in plan, except that the fastener of FIG. 1A is not grooved and the fastener of FIG. 1B is grooved. As will be described more fully below, fasteners in accordance with the invention have a unitary non-prismatic shank. This is in contrast to the classic configuration of fasteners of the prior art which have prismatic shanks of uniform geometric proportions, where the shanks have parallel sides and consistently congruent cross sections over their full length. Prior art prismatic shanks have cross sections that are substantially unvarying over the length of the shank, such that a cross section taken at any point along the shank length is uniformly congruent with another cross section taken at another point, meaning that the cross sections are substantially identical in form and size and will fit one within the outline of the other. In contrast, the term "non-prismatic" in reference to shanks of fasteners in accordance with the invention means that the elongated shank between a head and an end region that forms a pointed tip has segments, i.e., sections, with non-parallel sides and cross sectional diameters that are not uniform but vary at different points over the length of the shank. In other words, the shank comprises a plurality of longitudinally extending sections which have different diameters and which are non-congruent to one another. Non-prismatic grooved shank fasteners in accordance with the invention are referred to herein as "NPGS" fasteners.

FIG. 1A illustrates a fastener having an elongated non-prismatic shank 2 extending between a head 19 and a pointed tip section 18. The shank comprises a first stem section 3 adjacent to the head which may be cylindrical, a first tapered substantially frustro-conical section 4 that provides a transition between the cylindrical section 3 and a midsection 5, and a second tapered substantially frustro-conical section 6 that provides a transition between the midsection 5 and the pointed tip section 18. The first frustro-conical section 4 may taper relative to a central longitudinal axis 20 of the fastener at a declination angle of the order of about 0 to 3 degrees, with the smallest diameter of the section corresponding to and being at the junction of section 4 and the cylindrical stem section 3. The widest width or diameter, D, of the shank may be at the midsection, which may be either substantially cylindrical or have a slight taper of the order of about 0 to 1 degree. The lower (in the figure) frustro-conical section 6 may taper downwardly toward the pointed tip section at a declination angle of the order of about 1 to 5 degrees. Thus, as illustrated in the figure, the shank is widest in its midsection, and the tapered sections 4 and 6 provide transitions between the midsection and the stem section 3 and the pointed tip section 18, respectively. The width or diameter of the stem section 3 may be of the order of 0.77D; the mean width or diameter 11 of the tapered upper section 4 may be of the order of 0.88D; the mean width 13 of the lower tapered section 6 may also be of the order of 0.88D, and the width 7 of the bottom pointed tip section 18 may be 0.77D at the lower tapered section 6, where D is the widest diameter of the shank in the midsection.

For a shank having a length, L, representative proportional lengths of the various sections for the embodiments of FIGS. 1A and 1B may be as follows. Stem section 3 may extend for a distance of the order of 7% to 27% of the length of the shank (0.07L-0.27L). The upper tapered section 4 may extend for a distance of the order of 15% to 30% of the length of the shank (0.15L-0.30L); the midsection 5 may extend for a distance of the order of 20% to 35% of the shank length (0.20L-0.35L); and the lower section 6 of the shank may extend for a length of the order of 15% to 30% of the shank length (0.15L-0.30L). The tip section 18 may have the length of the order of 5% to 8% of the shank length (0.05L-0.08L). The head 19 of the fastener may be a flat circular top. These various section length ranges are merely illustrative of section lengths of a preferred embodiment. Actual lengths of the sections may vary from these ranges based upon a particular application for the fastener. It is important, for reasons to be described, that the fastener be sized such that the midsection having the widest diameter spans a joint between members being fastened. The overall length, L, of the shank corresponds to the penny weight.

The embodiment of the invention illustrated in FIG. 1B may have substantially the same geometry and dimensions as that of FIG. 1A, except that the non-prismatic shank of FIG. 1B has four longitudinally extending grooves 9 and corresponding ridges 10 symmetrically disposed about the circumference of the shank, as will be described in more detail below. The fastener is referred to as a NPGS fastener. As shown in the figure, the grooves and ridges may be located within the midsection and the tapered sections of the shank only. Moreover, as will be explained below, the grooves and ridges may be confined to those regions of the shank that experience the greatest loads in use, e.g., the midsection, and may extend only partially into the other sections. While the non-prismatic non-grooved shank embodiment of FIG. 1A is substantially more effective in carrying loads than conventional fasteners, the grooves and ridges of the embodiment of FIG. 1B afford greater strength and effectiveness, as will be explained.

Figure 2A:
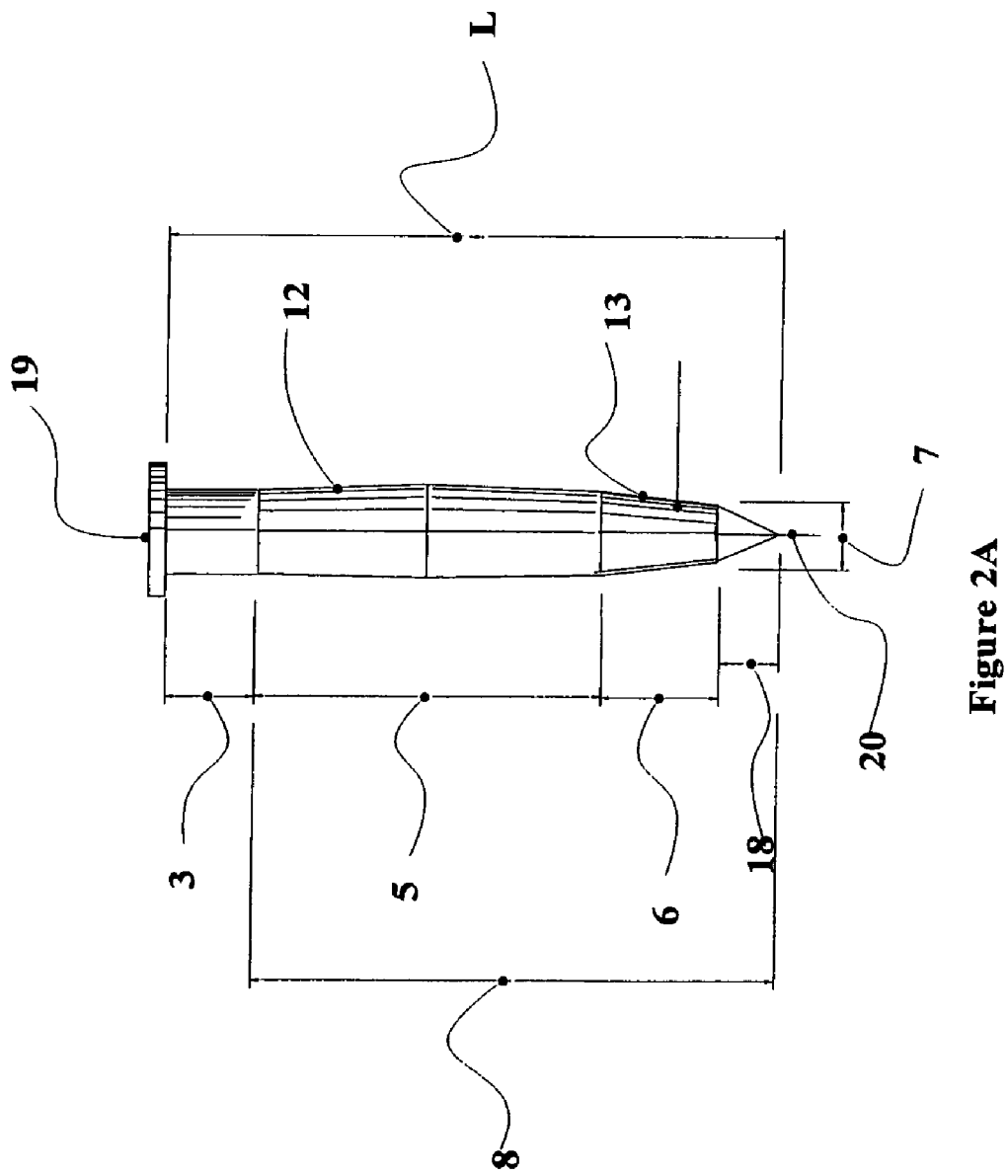

FIGS. 2A and 2B respectfully illustrate third and fourth embodiments of fasteners in accordance with the invention having non-prismatic shanks. As shown in FIG. 2A, the non-prismatic shank may comprise an upper stem section 3 adjacent to a head 19, a midsection 5, and a lower section 6 adjacent to a pointed tip section 18. The stem section 3 may be cylindrical, and have a section length of the order of 8% of the length, L, of the shank. The midsection 5 may be slightly tapered between about 0 to 1 degree and preferably about 0 degrees, and extend for a distance of the order of 60% of the shank length (0.6L). The lower segment 6 may be tapered between about 1 to 5 degrees, have an average width 13 of about 0.88D, and extend for a distance of approximately 25% of the length L of the shank (0.25L). The tip 18 may have a maximum width of about 0.77D, and extend for a length of the order of 7% of the shank length (0.07L).

The fastener of FIG. 2B may have substantially the same geometry and dimensions as the fastener shown in FIG. 2A, except that, as with the fastener of FIG. 1B, has four longitudinally extending grooves 9 and corresponding ridges 10 symmetrically disposed about the circumference of the shank. The fasteners of FIGS. 2A and 2B are particularly well-adapted for joints composed of more than two members and for joints with thin side plates, as will be described in more detail below.

Figure 3B:
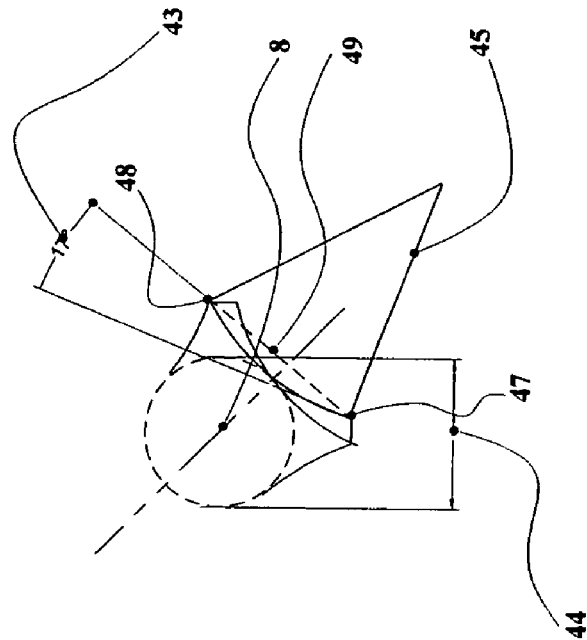
FIG. 3B is a diagrammatic view of a portion of the transverse cross section of FIG. 3A that is useful for illustrating the geometry of the grooves and ridges.
Figure 3A:
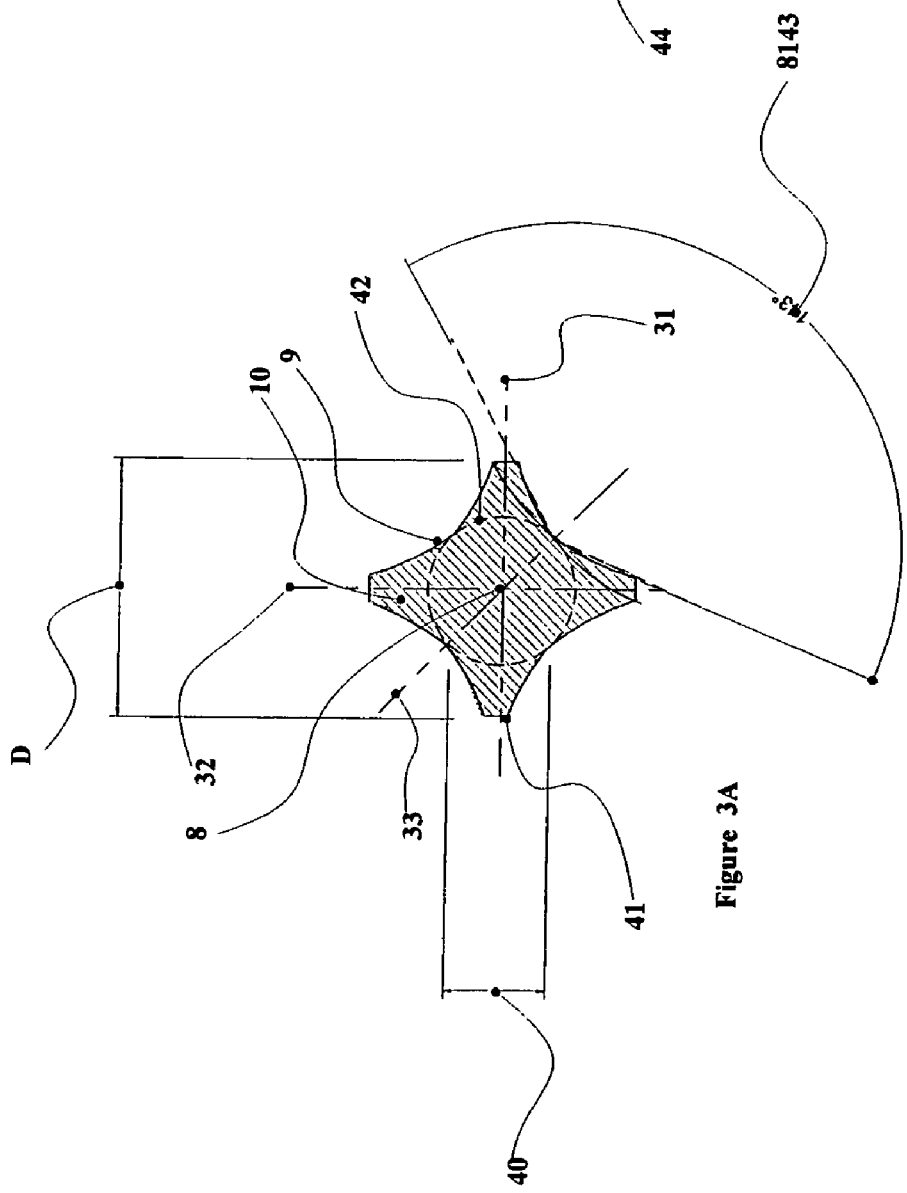
FIG. 3A is a transverse cross-sectional view taken generally along the lines 3A-3A of FIGS. 1B and 2B.

FIG. 3A is a transverse cross-sectional view of the non-prismatic grooved shank fasteners of FIGS. 1B and 2B (which may have the same cross sectional configuration) taken in a mid-length region of the shank. FIG. 3B is a diagrammatic view of a portion of the transverse cross section of FIG. 3A that is useful for describing the dimensions and characteristics of the grooves and ridges. As shown in FIG. 3A, the non-prismatic grooved shank of the invention has a cruciform transverse cross section comprising a central cylindrical core 42 supporting four tapered projections which form ridges 10 and grooves 9. The ridges and grooves are disposed circumferentially symmetrically about the central core with the ridges located 90 degrees apart on principal orthogonal transverse axes 31 and 32. Each ridge 10 has a circumferentially extending end portion 41 that forms a ridge tip. The diameter, D, of the shank is measured between opposing ridge tips, as shown, and is the widest width of the shank. The diameter 44 of the central core 42 may be of the order of 59% of the diameter, D, of the shank (0.59D). For reasons to be explained, NPSG fasteners in accordance with the invention preferably have no more or fewer than four orthogonal circumferentially symmetrically spaced ridges and grooves.

Figure 8:
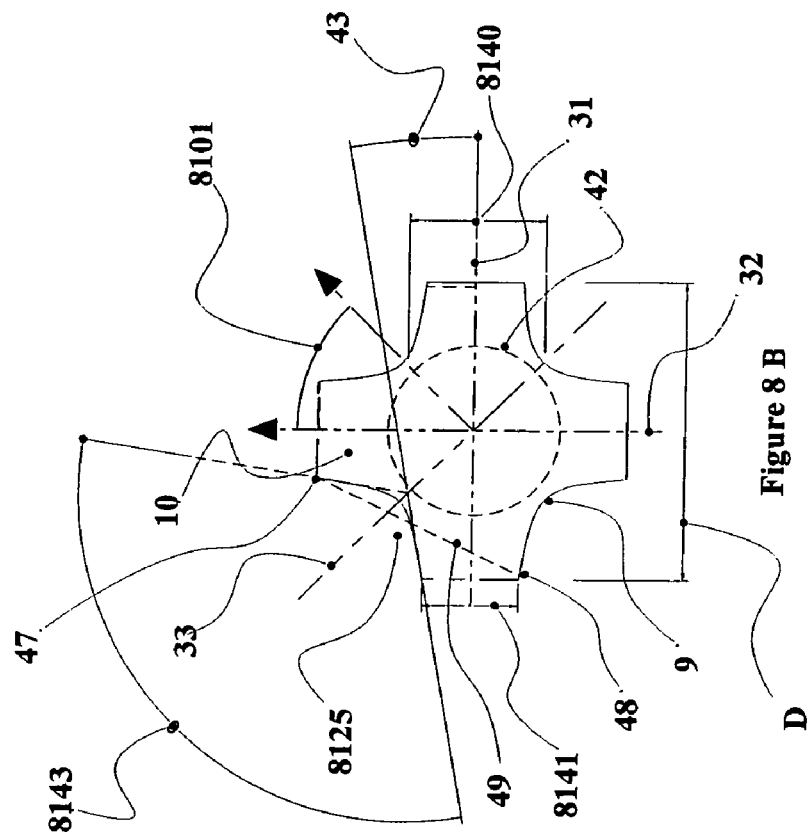
FIGS. 8A and 8B are transverse cross sectional views illustrating the geometry of the grooves and ridges of two different embodiments of grooved shanks in accordance with the invention.
Figure 8:
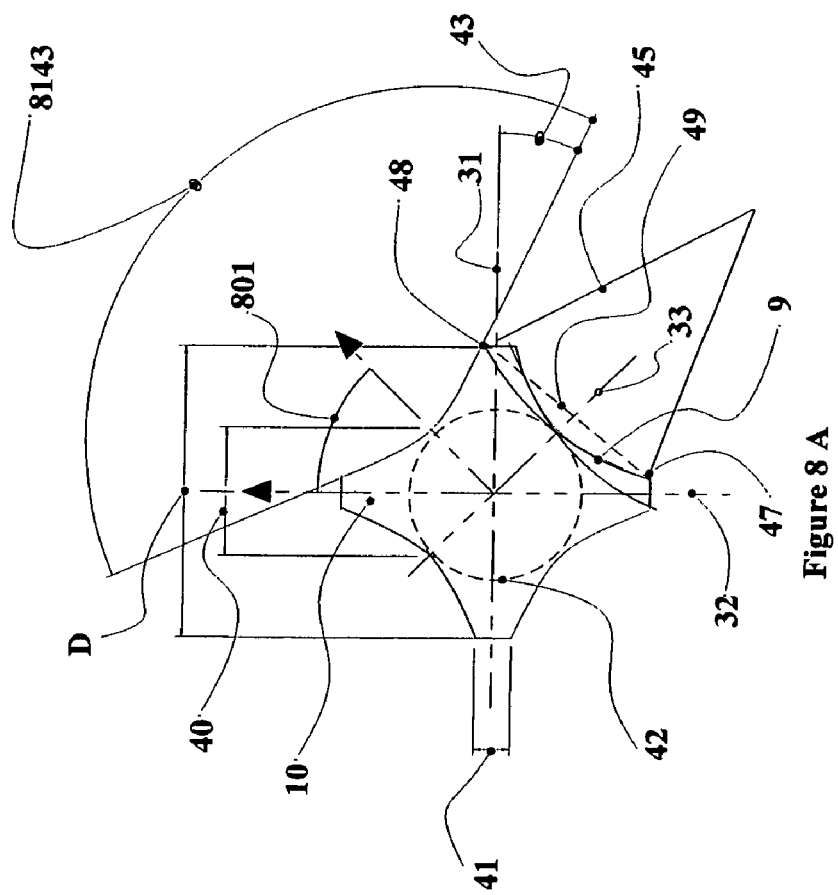

As shown in FIG. 3A, and also in FIG. 8A which is a diagrammatic view of the transverse cross section of the non-prismatic grooved shank of FIG. 3A, each ridge 10 may have a base width 40 adjacent the central core which is greater than the peripheral length of the ridge tip 41, and the grooves 9 may have a shallow concave configuration with sides that present a relatively small angle of slope 43 measured relative to a corresponding principal axis 31 or 32. This angle of slope is best illustrated in FIG. 8A as the angle 43 measured relative to the principal horizontal axis 31. The grooves are preferably constructed so that each side of a groove conforms to a portion of an arc having a radius 45 that is approximately equal to D and that subtends a chord 49 created by a line drawn from corresponding edges 47 and 48 of adjacent ridges, as best illustrated in FIGS. 3B and 8A. This creates an angular jaw opening 8143 (FIGS. 3A, 8A) for the groove 9 that, for reasons that will be explained in more detail later, is preferably in the angular range of about 105 to 145 degrees.

In determining the proportions and dimensions of the shank transverse cross section, factors related to column stability are relevant. One reason is because the shank must have the ability to be driven into parent material, as by hammering, without bending or buckling. For a given volume of shank, a corresponding force is required to set or drive the shank into the material. The proportions of the shank determine its ability, acting as a slender column (according to Euler's theory), to withstand an axial driving load without buckling. Moment of inertia, area, and radius of gyration are characteristics which may be used to analyze Euler columns and to determine appropriate proportions of the shank. As the fastener is driven into parent material, large axial loads are necessary because the fastener, as a slender projectile, must be given momentum to propel it about 25% to 35% of its shank length into the parent material at each blow. These forces are large enough to push the shank to the limit of its elastic stability, which is regulated by moment of inertia and elastic modulus of the shank material. For steel, the elastic modulus is nearly constant throughout the range of common alloys, even for higher strength materials. Consequently, increases in yield strength for a shank design which experience loads at the elastic limit do not appreciably augment its ability to resist buckling. For a given axial load near the elastic limit, in the non-prismatic fasteners of the invention there is a favorable distribution of mass about the longitudinal axis of the shank resulting in a large moment of inertia that resists buckling, regardless of tensile strength. Because a non-prismatic fastener in accordance with the invention desirably has a nearly uniform moment of inertia about a rotational angle of at least 45 degrees (e.g., the angle between axis 32 and diagonal axis 33, for example), shank configurations with fewer than four ridges, such as Y-shaped shanks of the type shown in U.S. Pat. No. 5,143,501 to Leistner et al., lack symmetry and are not functionally desirable.

The total circumferential peripheral length 41 of the four ridges of the shank should be at least equal to or greater than 15% of the circumference of the shank, and the central core 42 should contain at least 44% of the shank cross-sectional area. Otherwise the walls of the ridges acting to develop the moment of inertia of the shank are poor contributors to prevent Euler-type buckling in column compression as experienced in hammering the shank during installation.

The total ridge surface peripheral length should be less than about 38% of the circumference of the shank, and act in association with the angular jaw opening of the groove to allow elastically deformed parent material to enter readily into the groove areas and create a resisting force by contact with the ridge walls. The elastically deformed material in the groove has as a principal function providing support to the shank, which is necessary to afford both lateral and axial load carrying ability to the fastener, as will be explained. The radial depth and configuration of the jaw opening 8143 should also be selected to preserve the body of the shank core to be substantially 44% or more of the transverse cross-sectional area. Because the angular jaw opening of the groove between adjacent ridges should be in the range of at least about 105 to 145 degrees to provide an angular opening adequate to permit sufficient elastically deformed parent material to enter the groove to support the shank, the total peripheral ridge surface must likewise be limited to a fraction of the circumference at the maximum diameter, D, of the shank. Shank configurations with more than four ridges are not functionally desirable since they tend to close off the groove opening, limit the ability of elastic parent material to enter the groove and reducing shank support, and require relatively narrow ridges which may be too weak to provide adequate strength to permit the fastener to be driven into the parent material. Rather, as will be described more fully below, it is preferred that the jaw be opened up, not closed off. Moreover, the fasteners in accordance with the invention such as illustrated in FIGS. 1A, 1B, 2A and 2B have shanks that may be driven into parent material with any rotational alignment of the grooves and ridges. It is not necessary to align the shanks relative to the grain of the material in order to achieve the desired performance.

Figures 4A, 4B:
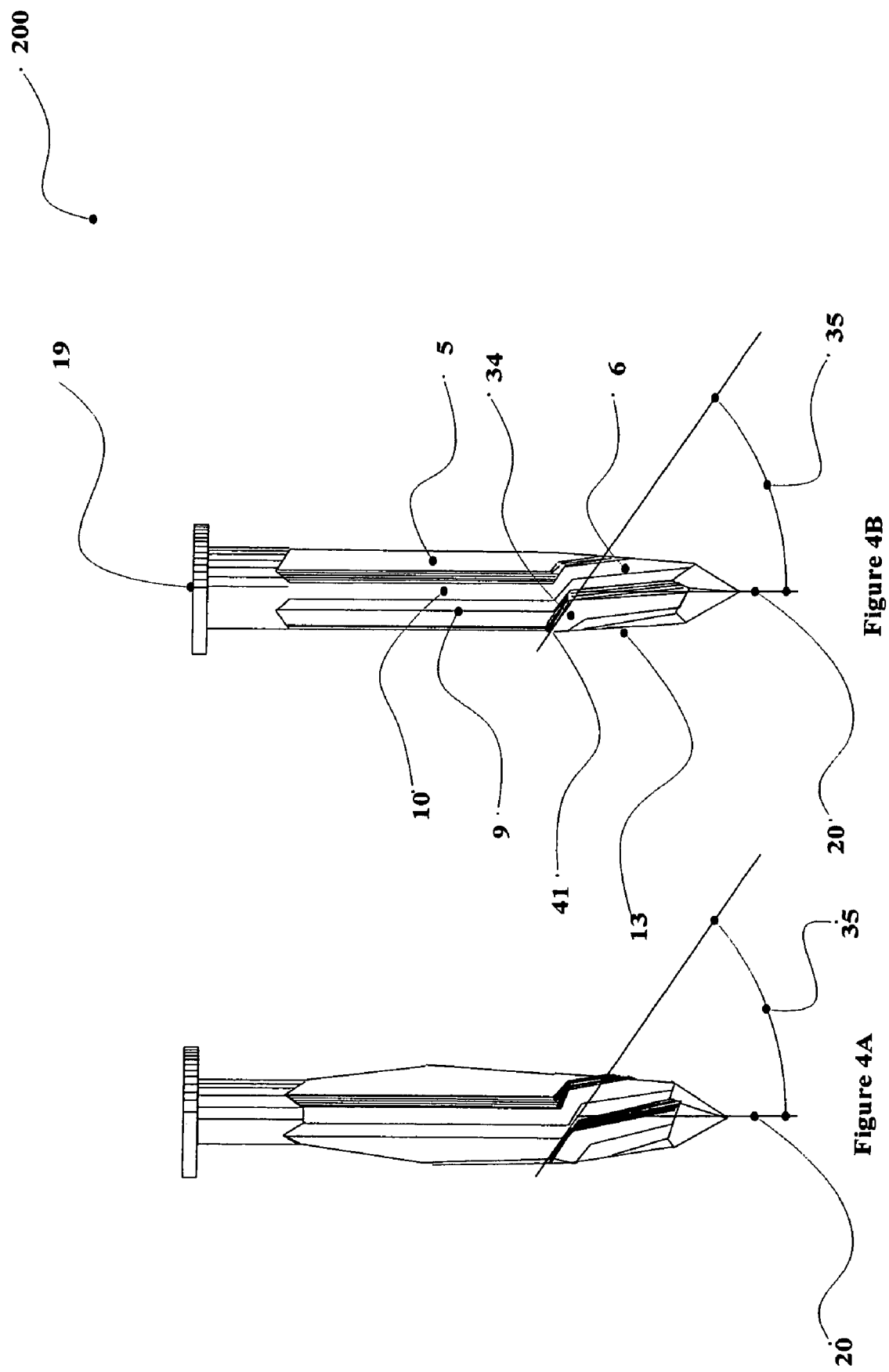
FIGS. 4A and 4B illustrate, respectively, other embodiments of a non-prismatic grooved shank fastener in accordance with the invention based upon the embodiments of FIGS. 1B and 2B, the shanks having a lower section that is mechanically deformed or twisted relative to the longitudinal axis of the shank.

FIGS. 4A and 4B illustrate two additional embodiments of NPGS fasteners in accordance with the invention, comprising, respectively, modifications of the embodiments of FIGS. 1B and 2B. As shown, the embodiments of FIGS. 4A-B comprise non-prismatic grooved shanks in which the lower section 6 of the shank is formed such that the grooves and ridges are twisted or rotated by an angle of the order of about 45 to 90 degrees relative to the longitudinal axis 20 of the shank. This deforms the ridges into the groove spaces and creates shoulders 34 at the points 41 where the shank is twisted. These points are preferably located at or substantially below the transition between the midsection 5 and the lower section 6 of the shank, so that in use they can be located between a joint interface and the tip of the fastener. These shoulders develop a resistance below the joint interface, as will be explained in connection with FIGS. 5 and 6, by engaging parent material in the grooves above the shoulders and providing an obstruction to withdrawal of the shank. This affords greater axial load carrying ability.

FIG. 5 illustrates a fastener 200 as shown in the embodiment of FIG. 4B employed in a simple joint in which a relatively thin faceplate 501 is connected to a parent material base 500, where the fastener holds the faceplate to the parent material which serves as a foundation for the faceplate. Preferably, the fastener 200 is selected such that the thickness 503 of the faceplate is less than or equal to the length of the top stem section 3 of the shank. The fastener of FIG. 2B (without the twisted shank) may also be effectively employed in the joint illustrated in FIG. 5. The preference for these fasteners in this joint is that the diameter of the midsection is approximately equal to that of the cylindrical stem section 3. This is preferred because the faceplate 501 may be of metal or other material having the minimal elastic properties. Since penetrating the faceplate with the fastener creates a hole corresponding to the maximum diameter or width of the shank, it is desirable that the diameter of the hole in the faceplate 501 created by the shank be approximately the same as that of the diameter of the upper cylindrical section 3 in order to more securely fasten the faceplate to the foundation material.

Figure 6:
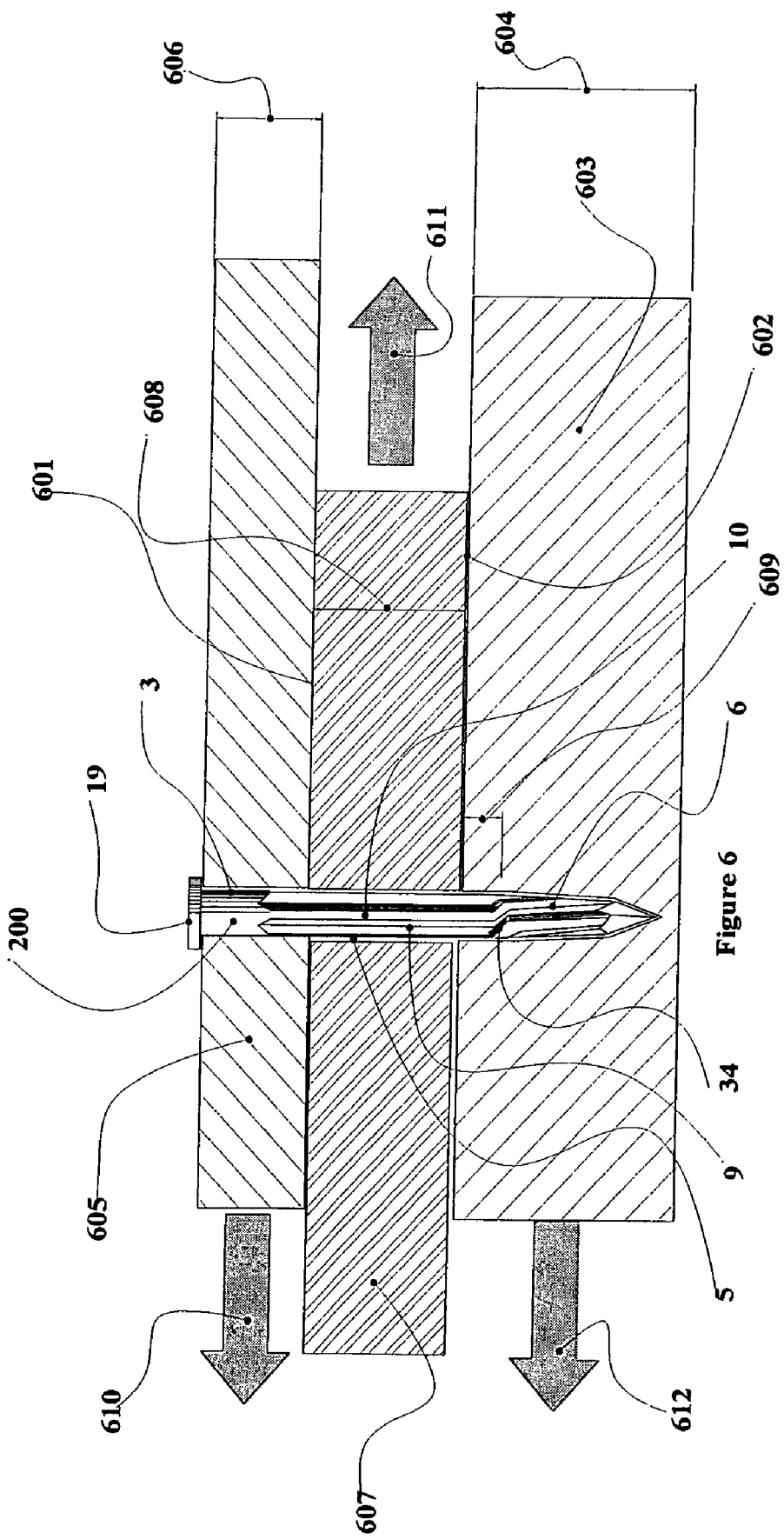
FIG. 6 is side elevational view of a cut-away section illustrating the fastener of FIG. 4B in a joint comprising three members.

FIG. 6 is a cross-sectional view of a compound joint comprising joints 601 and 602 between three members 603, 605 and 607 connected by a fastener 200 which may be the embodiment of the fastener illustrated in either FIG. 2B or FIG. 4B, FIG. 6 illustrating the fastener of the embodiment of 4B being used in the joint. These particular embodiments of the fastener are preferred since it is desired that the fastener have its maximum diameter located in all three members 603, 605 and 607 and span the joints 601 and 602, since these are the areas subject to the greatest stresses. Additionally, it is also preferable for the fastener to have a length such that the midsection of the shank extends through the joint and well into the member that is furthest from the head (joint 602 and member 603 in the figure) as shown at 609. Additionally, if a fastener having shoulders 34, such as described in connection with FIGS. 4A-B, is used, it is desirable to position the shoulders 34 well into the lower member 603 to provide higher withdrawal resistance and greater integrity to the compound joint. As shown in FIG. 6, the joint members 603 and 605 may be subjected to lateral forces 610 and 612 in a first direction (to the left in the figure) and the intermediate member 607 may be subjected to a lateral force 611 in the opposite direction. By having the maximum diameter of the shank spanning both joints 601 and 602, the fastener 200 affords the greatest load carrying ability to the compound joint, for reasons which will be explained more fully in connection with FIG. 10.

Figure 7:
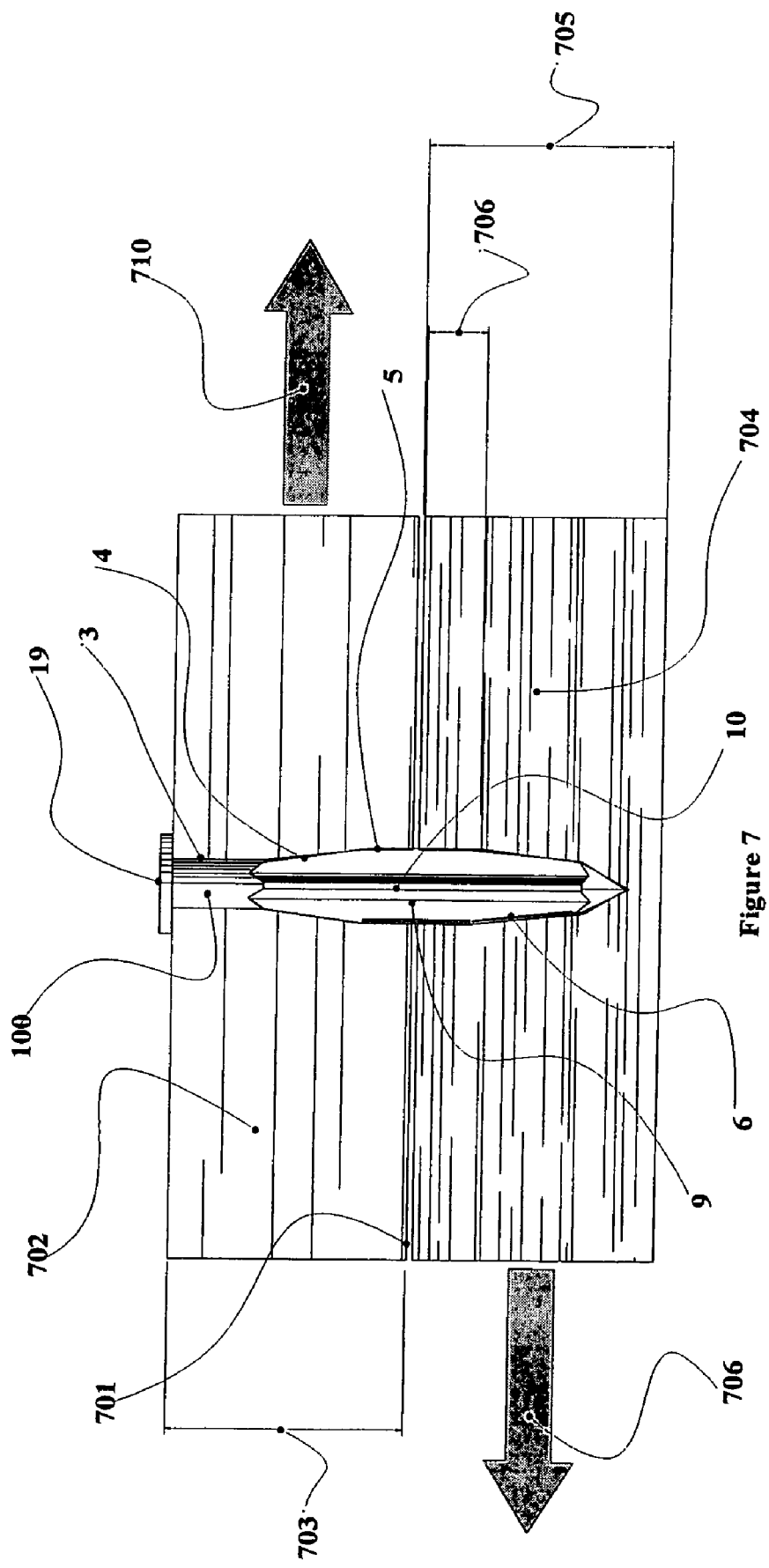
FIG. 7 is a side elevation of a cut-away section showing the fastener of FIG. 1B in a joint comprising two members.

FIG. 7 is a cross-sectional view illustrating the fastener of FIG. 1B used in a simple two-member joint 701 in which a first member 702 having a thickness 703 is connected to a second member 704 having a thickness 705. As shown in the figure, the fastener 100 is preferably selected to a have length such that the midsection of the fastener is located at and spans the joint 701, and extends into both members 702 and 704.

The midsection of the fastener is the section with the greatest moment of inertia, and will experience the maximum bending moment which the shank will experience, as will be described in connection with FIG. 10. Accordingly, the maximum diameter and maximum strength of the shank should be located at the area that experiences the maximum moment. The length of the midsection may be determined by taking into consideration the strength of the parent material and the depth of penetration of the tip into the parent material. Preferably, the midsection is embedded in the material in the range of at least 27% to approximately 35% of the penetration depth of the tip. For a parent material with high elastic modulus, the embedded depth may be in the lower end of the range. For a lower elastic modulus than wood, the embedded depth should be in the higher end of the range to afford adequate joint strength. For the non-prismatic fastener of FIG. 1B having a maximum diameter, D, and length, L, the respective minimum and maximum lengths $L_{min}$ and $L_{max}$ in inches to be embedded in wood can be calculated if the maximum effective depth of tip penetration is to be achieved. These are:

$$L_{min} = 13.47D \quad L_{max} = 16.94D$$

The benefit of the structure of a fastener in accordance with the invention is the significantly increased ability of the shank to resist both longitudinal and transverse forces over a standard round cylindrical nail and other finned or ridged configurations. These advantages can be quantified by testing the impact loads by hammering the fastener into a medium, and lateral loads can be tested using a shear force tending to shear two members apart across a joint.

The following Table 1 presents test results showing a comparison of safe working load (SWL) for a standard cylindrical wire nail and for NPGS fasteners in accordance with the invention, as shown in FIGS. 1B and 2B. The table indicates the tested fasteners by nominal diameter. Standard nails have a constant nominal diameter over their length, while fasteners in accordance with the invention are compared in Table 1 with standard nails using an average mean diameter of all segment diameters or widths of the shank.

32% of the circumference in the midsection where the shank has the largest diameter, D, and experiences the principal shear load. The angular jaw opening of the grooves of the shank of FIG. 8A is near the upper end of the preferred range of about 145 degrees. A shank having a transverse cross section as illustrated in FIG. 8A when used in a joint such as shown in FIG. 7 will experience a load that is substantially the same within 45 degrees of any of the axes 31, 32 or 33 shown in the figure, making alignment with the material being fastened unnecessary. Additionally, the moments of inertia across each axis of the various shank sections are approximately equal. The resistance to lateral bending that the non-prismatic grooved shank of the invention experiences will not vary substantially with axial alignment for a lateral load. A shank with a cruciform cross section and geometry, as illustrated in FIG. 8A, provides a moment of inertia with a maximum radius of gyration and affords substantial resistance to bending as a slender column, as compared to shanks having thin fins, such as the star-shaped and complex shaped shanks of the previously referenced U.S. Pat. No. 4,973,211 to

TABLE 1

Safe Working Load
For 1 inch Tip Penetration Sorted by Shank Characteristics

| STD WIRE | | | NPGS FIG. 1B | | | NPGS FIG. 2B | | |
|---|---|---|---|---|---|---|---|---|
| D | Imax | SWL | Davg | Imax | SWL | Davg | Imax | SWL |
| 0.113 | 0.000008 | 38 | | | | | | |
| 0.131 | 0.0000144 | 55 | 0.128 | | | 0.138 | 0.0000073 | 67 |
| 0.148 | 0.0000236 | 59 | 0.147 | 0.0000114 | 70 | | | |
| 0.162 | 0.0000338 | 61 | 0.165 | 0.0000214 | 101 | 0.16 | 0.0000133 | 74 |
| 0.192 | 0.0000667 | 87 | 0.186 | 0.0000339 | 115 | 0.193 | 0.0000308 | 74 |

Imax = Maximum Moment of Inertia
Davg = Average Mean Diameter of all Segments

As shown in Table 1, non-prismatic grooved shank fasteners in accordance with the invention exhibit substantially greater SWL over a standard wire nail of a comparable diameter. For example, a standard wire nail having a nominal diameter of 0.162 inches has a SWL of 61, while the NPGS fasteners of FIGS. 1B and 2B of the same diameter have substantially greater SWLs of 101 and 74, respectively.

As described earlier, FIG. 8A is a diagrammatic view of a transverse cross section of a non-prismatic shank fastener in accordance with the invention as shown in FIG. 3A. FIG. 8B illustrates a transverse cross section of another embodiment of the invention having projecting ridges that are wider at their tips and having a smaller angular jaw opening for the grooves than the embodiment illustrated in FIG. 8A. The embodiment of FIG. 8A depicts a groove 9 having a minimal slope angle 43 relative to a principal axis 31 or 32 of the order of 25 degrees, which affords a cosine value greater than 0.9. As previously described, the grooves 9 are shaped over a small arc of a relatively large diameter, preferably of approximately 0.35 radians (approximately 27°), so that the surface of the groove is substantially cylindrically concave and the sides are generally planer. This causes the ridges 10 of FIG. 8A to be cone shaped, being wider at their base 40 with an approximate width of the order of 0.44D than at their ridge tips 41, which have a width of the order of 0.25D, but not less than 0.12D. In accordance with the invention, the peripheral surface length of the ridges should be greater than 15% but less than 38%, and preferably in the range of about 20% to Potucek and U.S. Pat. No. 7,097,403 to Seace. This is an advantage when the fastener is installed by hammering.

FIG. 8B illustrates a transverse cross section of another embodiment of a non-prismatic grooved shank in accordance with the invention. As shown, the cross section has a cruciform shape and may have the same nominal diameter, D, as the embodiment of FIG. 8A and the same nominal diameter of 0.59D for central core 42. The grooves 9 have a shape 8125 so that the concave surface affords a slope of the order of 9 degrees with a cosine value of approximately 0.9 relative to a principal axis 31 or 32. The ridges are tapered so that tip 8141 has a width of the order of 0.3D, and preferably 0.25D, and are somewhat thinner than the base 8140 of the ridge adjacent the central core, which may be of the order of 0.44D. The ridge surface is preferably in the range of 20% to 32% of the circumference, but is preferably not greater than 38% to afford a sufficiently wide jaw opening for the groove to enable parent material to readily enter the groove and create a resisting force, while limiting the size of the ridges to minimize the plastic deformation of the parent material produced by driving the fastener into the material. The depth and configuration of the jaw opening should be sufficient to preserve the body of the shank core, specifically with regard to the arc of the jaw opening, which for NPGS shanks in accordance with the invention should be in the range of the order of about 105 to 145 degrees.

For the embodiment illustrated in FIG. 8B, the jaw opening 8143 is near the low end of the angular range of about 105 degrees, and the projections 10 forming the ridges are more wedge-like in shape than the projections of the embodiment of FIG. 8A. This affords the shank of FIG. 8B a greater moment of inertia and a higher capacity to be driven into hard woods, such as Douglas Fir, while providing sufficient jaw opening to the groves to allow compressed elastic parent material to enter the grooves and provide support and resistance to the shank. As will be explained in connection with FIG. 10, this is important to the superior results afforded by the invention. For the NPGS shanks of the invention, the angular jaw opening should be in the range of the order of about 105 to 145 degrees.

The configuration and geometry of the NPGS fastener of the invention allow the shank to enter the parent material with a minimum of distortion and tearing of the parent material at the outer radius of the displaced material. This decreases strain and the tendency toward splitting of the parent material. Moreover the relative large angular openings of the jaws of the grooves allows large segments of wood matter to enter the grooves and conform closer to the shank surface. The greater contact of parent material with the groove surface at a plane generally normal to the applied load results in a nearly uniform distribution of load across the axis of the shank. This is in contrast to the load distribution across a conventional cylindrical shank, which acts on the shank radially and has a substantially sinusoidal load profile that varies from a maximum at the center of the shank to substantially zero at the edges. This will be shown and described more fully in connection with FIGS. 9 and 11A-B.

The following Table 2 illustrates the results of tests comparing the safe working load (SWL) of standard wire nails with non-prismatic grooved fasteners in accordance with the invention. The results demonstrate that the invention affords substantially increased lateral safe working loads for an equivalent weight and quantity of standard wire nails. Thus, the invention enables joints to be constructed with fewer fasteners for the same joint load capacity than is possible using standard round cylindrical nails, or alternatively enables smaller fasteners to be employed to achieve the same load capacity.

TABLE 2

Safe Working Load
For 1 inch Tip Penetration Sorted by Shank Weight

| | | STD WIRE | | NPGS FIG. 1B | | NPGS FIG. 2B | |
|---|---|---|---|---|---|---|---|
| PnyWt | Length | Nails/lb | SWL | Nails/lb | SWL | Nails/lb | SWL |
| 6 | 2 | 174 | 38 | 159 | 70 | 185 | 67 |
| 8 | 2½ | 103 | 55 | 93 | 101 | 110 | 74 |
| 10 | 3 | 68 | 59 | 62 | 115 | 72 | 68 |
| 12 | 3¼ | | 59 | | | | |
| 16 | 3½ | 48 | 61 | 48 | 115 | 51 | 74 |

Having described the geometry and structure of non-prismatic grooved and non-grooved fasteners in accordance with the invention, and their superior load handling capacity to standard round cylindrical wire nails, the reasons why fasteners in accordance with the invention achieve substantially superior performance to both standard round cylindrical fasteners as well as the other finned and non-finned fasteners of the prior art will now be explained.

Figure 9:
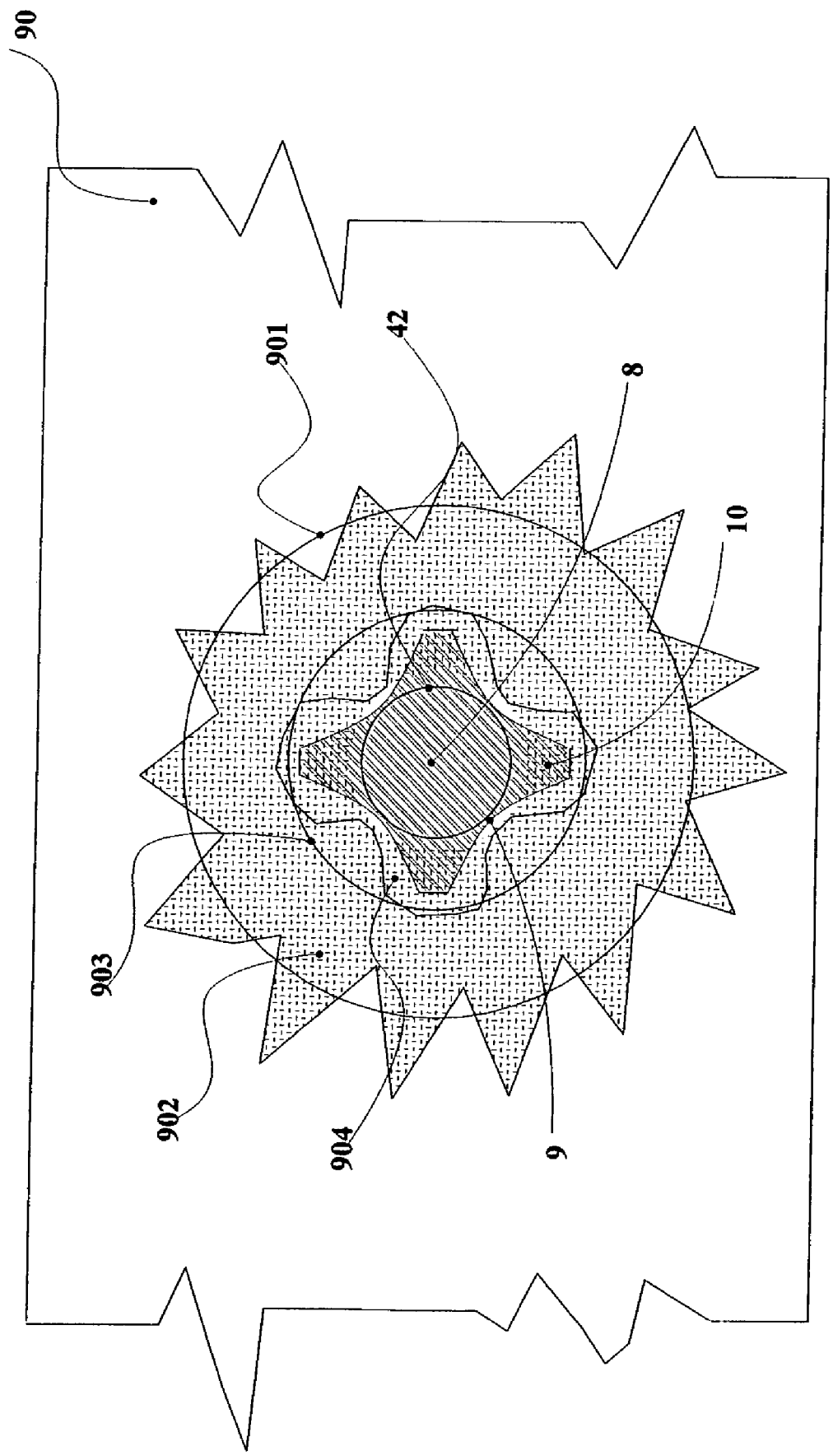
FIG. 9 is a diagrammatic view showing a fastener in accordance with the invention having a transverse cross section corresponding to that of FIG. 8A and illustrating the deformation of parent material into which the fastener is embedded.

FIG. 9 is a diagrammatic view showing an NPGS fastener having a transverse cross section as shown in FIG. 8A embedded in parent material 90, and showing the deformation of the parent material caused by the fastener being driven into the material. Referring to FIG. 9, the fastener shank 8 comprises a central core 42 having symmetrically disposed grooves 9 and ridges 10, as previously described. Upon being driven into the parent material, the ridges displace parent material as indicated at 904. Grooves 9 are sized to allow the material 904 displaced by the ridges to relocate within the grooves and create an impact column, or corona, 903 of deformed parent material in proximity to the shank. The deformation is generally limited in extent to the region of the corona 903, which may have a nominal diameter slightly greater than that of the shank. The plastically deformed material compressed within the corona 903 exerts a pressure and a force upon the undisturbed parent material, which creates elastic stresses 902 within an elastic corona 901 that extends beyond the shank core and generally outside of the plastic corona 903.

It has been found that a grooved shank having a geometry and dimensions in accordance with the invention enables the shank to enter into the parent material and minimize distortion and impact on the integrity of the parent material, which permits the material to rebound elastically to loads and stresses. In contrast to the commonly held view that distortion and deformation are important in establishing the holding power of the fastener, it has been found that holding power is instead dependent upon minimizing distortion and deformation, and the invention instead seeks to maximize elastic compression of the parent material. The geometry of the grooved shank of the invention and the configuration and arrangement of grooves and ridges minimize parent material distortion by allowing the displaced material to maintain contact with the shank with a minimum of plastic deformation. To achieve this, the grooves must be large enough to allow parent material to enter the groove crescent easily. Moreover, the associated ridges must be substantial enough to develop the required strength of the shank to resist bending as a beam and column, while not being so large as to cause undue plastic deformation and distortion of the parent material. The invention prescribes shanks having a geometry and configuration within ranges of values that minimize parent material distortion and maximize the amount of elastic material that contacts the shank of the fastener. Shanks having large volume grooves with narrow vane-like ridges are unsatisfactory because the shank lacks sufficient strength to resist deformation and bending, and shanks with wide, strong ridges having narrow grooves are undesirable because parent material cannot easily enter the grooves but is forced into the surrounding material causing plastic deformation in a manner similar to that caused by a solid cylindrical shank. Cylindrical nails and other known prior art fasteners create, in effect, a debris field about the shank, with the result that the parent material has limited contact with the shank and provides limited support to the shank to resist loads. This is illustrated by FIGS. 11A and 11B.

Figure 11A:
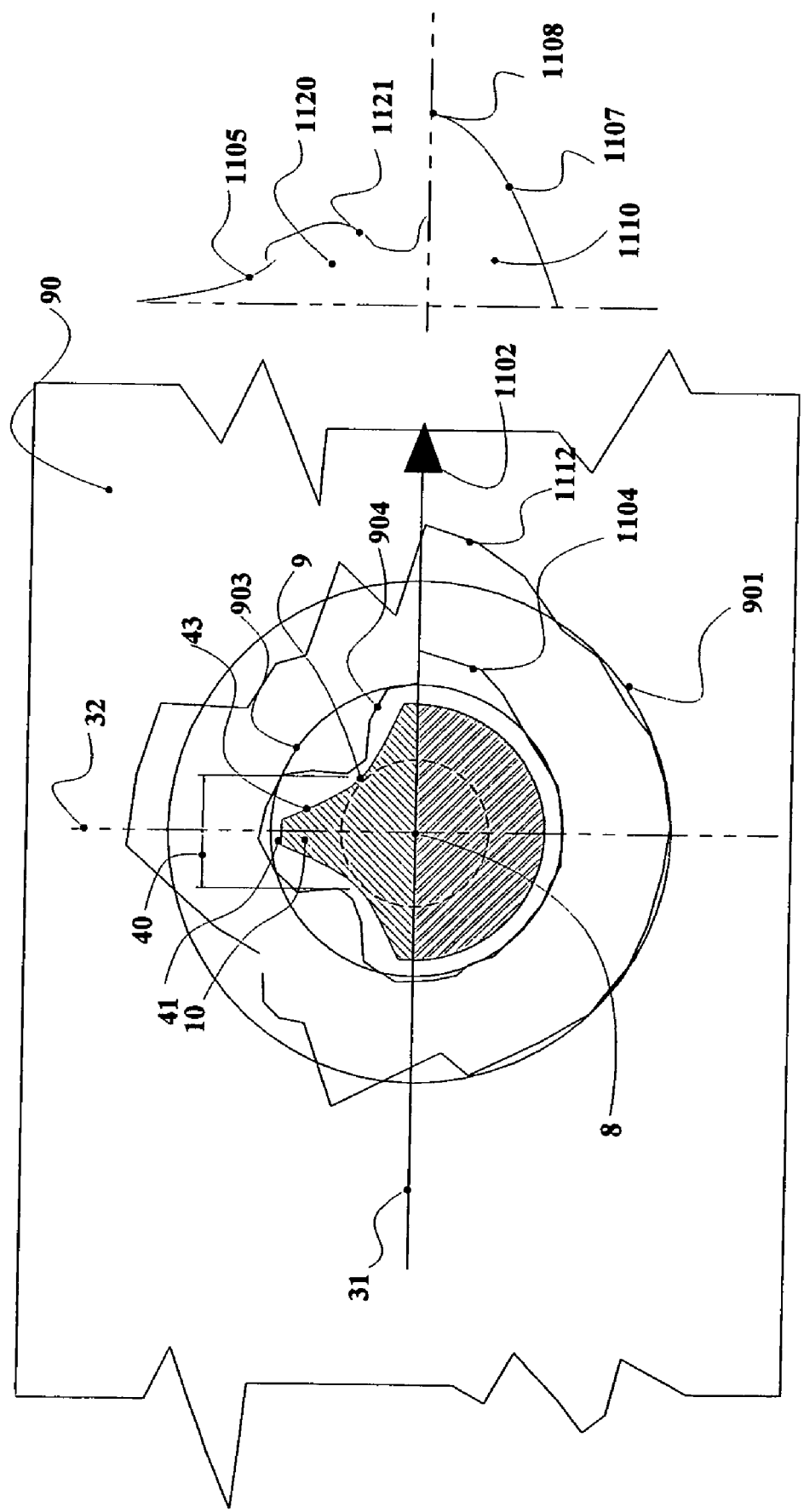
FIGS. 11A and 11B are composite transverse cross sectional views of fastener shanks of the embodiments of FIGS. 8A and 8B, respectively, and common round cylindrical shanks having the same nominal diameter, the figures showing the affects of the shank geometry on parent material, and showing the load profiles of the different cross sections.
Figure 11:
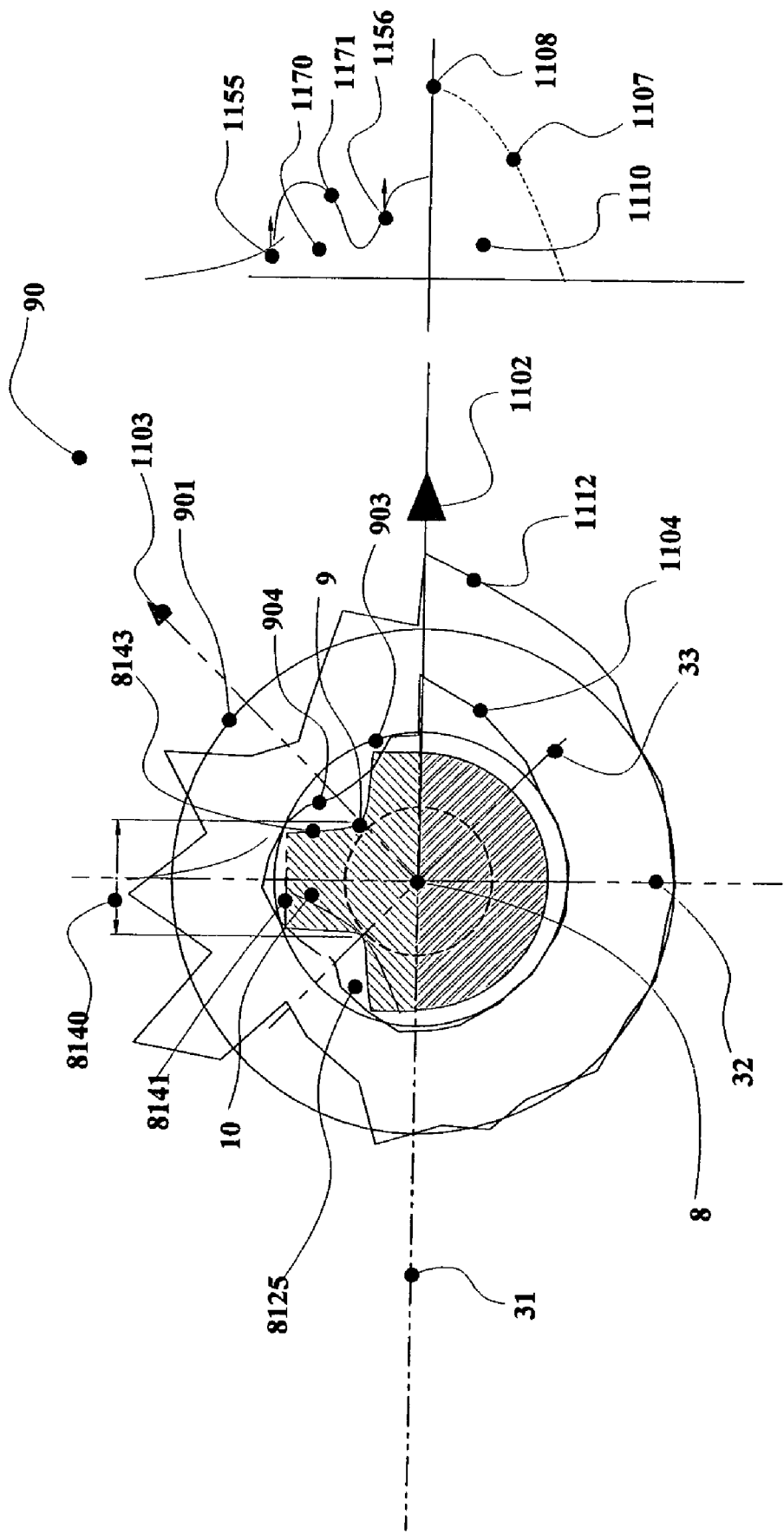

FIGS. 11A-B are composite transverse cross-sectional diagrams which illustrate the parent material deformation and load distribution for grooved fastener shanks in accordance with the invention (shown in the upper half of the figures) as compared with the parent material deformation and load distribution for a common cylindrical prismatic shank, i.e., a common nail, as shown in the lower portion of the figures. FIG. 11A shows the comparison between an embodiment of a non-prismatic grooved shank in accordance with the invention as shown in FIGS. 8A and 9 and a common cylindrical shank having the same nominal diameter; and FIG. 11B shows the comparison between a non-prismatic grooved shank according to the embodiment of FIG. 8B and the common cylindrical shank. As explained in connection with FIG. 9, the ridges 10 and grooves 9 of the non-prismatic grooved shank of the invention are configured so that the grooves minimize plastic distortion at a radius 903 of the parent material. This decreases strain and reduces shear splitting of the material, and the grooves create voids and a space into which parent material can be displaced so as not to fill the plastic corona 903. The concave surfaces 43 of the grooves allow the parent material to conform close to the shank body so that load 1120 is distributed (as shown in the upper stress profile curve 1121) in a generally uniform envelope from the center of the shank core to well beyond the diameter, D, of the shank. The grooves and ridges engage and react against the parent material. A counter reaction at each ridge tip 41 corresponds to the shear stress 1105 in the parent material develops and adds resistance to shank movement.

In contrast, as shown in the load profile in the lower half of FIG. 11A, the uniform cylindrical prismatic convex shaft distributes load across its diameter, as shown at 1110, in accordance with an envelope 1107 that is approximately sinusoidal. This envelope is characterized by a high pressure 1108 on the principal axis 31 corresponding to a load 1102, and drops off to approximately zero at the outer diameter of the shank. As shown in the figure, the plastically deformed area 1104 of the parent material extends well into the plastic corona 903, which in turn affects the elastically stressed material 1112 and increases its extent into the elastic corona 901.

As can be clearly seen in FIG. 11A, the distribution of forces across the width of the shank of the invention afford more uniformity by decreasing the peak stress in the parent material produced by the load 1102 and by increasing the lateral load carrying capability of the fastener. As compared to a standard cylindrical wire nail of substantially the same shank volume, the strength of a NPGS shank of the invention in bending, as reflected in its moment of inertia, is substantially greater.

FIG. 11B is a diagrammatic view similar to FIG. 11A that compares the embodiment of the NPGS shank of the invention illustrated in FIG. 8B to a common cylindrical shank fastener. The figure illustrates the distribution of force 1110 to the parent material caused by the common cylindrical shank as compared to the force distribution 1170 to the parent material caused by the invention. The load distribution is shown relative to the axis 1102 peak load.

As shown and as previously described, the shank of the invention has grooves 9 that are shaped to have a concave surface 8125 that is nearly normal (at 8143, for example) to a principal axis 31 or 32, and the ridges are tapered so that their tips 8141 are only slightly thinner than their base 8140 adjacent to the central core of the shank. The concave surface of the grooves pass load to the parent material in a more nearly uniform envelope 1171 than the nearly sinusoidal envelope 1107 of the cylindrical shank, as shown by comparing the stress profiles in the upper and lower halves of the figure. A counter reaction at each ridge tip 8141 equaling the shear stress 1155, 1156 in the parent material will develop and add resistance to the shank movement. (A similar counter reaction will develop in the ridge tips 41 in FIG. 11A.) As the load moves relative to the principal axes 31, 32 to a diagonal axis 33, the principal vector of force 1103 continues to engage parent material 90 with minimum distortion and nearly uniform load envelop. The distribution of force across the width of the shank of the invention decreases the peak stress in the parent material and increases the lateral load capability of the fastener as compared to the round cylindrical fastener. Moreover, as will be explained in connection with FIG. 10, the shank of the invention exhibits a greater resistance to bending as compared to the cylindrical wire nail of the same volume that is reflected in a greater moment of inertia. Thus, the grooved shank of the invention can support a narrower nominal diameter, D, for a longer penny weight length, L. This allows longer, stronger fasteners for thicker joints.

Figure 10:
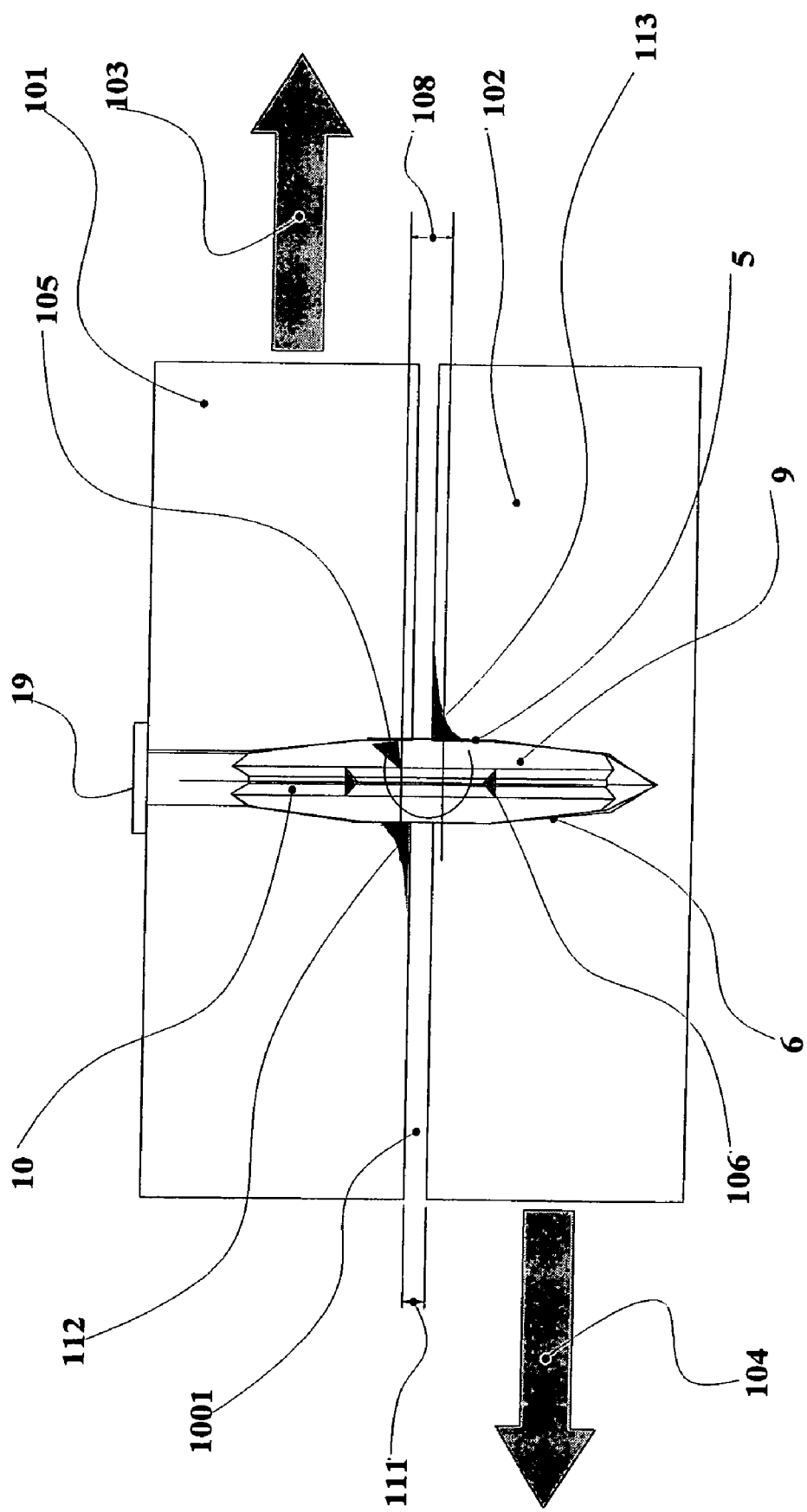
FIG. 10 is a diagrammatic view showing a side elevation of the fastener of FIG. 1B joining first and second members which are subjected to opposing lateral loads which form a joint couple, the figure illustrating the operation of a fastener in accordance with the invention.

FIG. 10 is a diagrammatic view showing a side elevation of the embodiment of the fastener of FIG. 1B joining first and second members which are subjected to lateral loads, and illustrates the principles of the invention which contribute to its the superior performance over known fasteners. Although the embodiment illustrated in FIG. 10 is that shown in FIG. 1B, the principles of operation are the same for other embodiments of the invention.

Referring to FIG. 10, the fastener is embedded in first and second members 101 and 102 with the midsection of the fastener comprising its widest diameter disposed at and spanning the joint 1001 between the two members. The shank functions as a beam that reacts against the joint where the two members 101, 102 are experiencing opposing loads 103, 104, respectively. The midsection of the shank experiences and resists the maximum bending moment which is exerted on the joint. The shank supports a couple 105 at the joint, and has its greatest moment of inertia in the midsection. The moment of inertia resists distortion at the point of the couple 105. The fastener and the parent material distribute strain in a mutually dependent manner. When the distribution of strain is altered, fastening properties are altered. The non-prismatic shank of the invention distributes strain along the length of the shank and in the parent material in a way that optimizes both parent material strength and fastener shape.

As the shank of the fastener is stressed by the opposing forces 103, 104, couple 105 develops at the joint interface that tends to rotate the shank in the direction of the forces on its upper and lower (in the figure) sections, and the shank receives support from the parent material, as indicated at 112 and 113. This support determines (and reduces) the length 108 of the shank that acts as a beam and, accordingly, increases the load capacity of the shank. As long as the parent material at 112, 113 remains elastic, its support is effective, and the maximum stresses to the shank are confined to a small length 108 about the joint. The diameter of the top stem portion of the shank may be less than the midsection since its purpose is primarily to serve as a delivery system for delivering the midsection non-prismatic shank to the joint interface 1001. Similarly, the diameter of the lower section of the shank may also be reduced relative to the midsection. The maximum cross-sectional area and moment of inertia of the shank span the joint where the couple 105 is created. Thus, the shape of the shank need not be uniform over its length, and may be characteristically non-prismatic. This is why the upper section 4 and lower section 6 of the shank may be tapered, and have smaller diameters than the midsection.

The impressed loads in the parent material members also create tension 106 along the axis of the shank. Initially, the extent of the maximum bending moment is close to the joint interface. A friction fastener shank begins aggressive plastic failure as the plastic compression in the parent material in support areas 112 and 113 increases and effectively increases the shank's beam length 108 at the point of the applied couple 105. As the load increases, elastic stress compresses the parent material in a spring-like fashion. This also causes the shank to bend, creating work against the imposed couple. The less the shank bends, the less pronounced the load profile is in the parent material above and below the joint interface, and the greater the range of elastic reaction present in the parent material. This is the reason it is necessary to minimize the amount of plastic distortion of the parent material caused by the fastener. The greater the plastic distortion of the parent material, the less support the parent material affords to the fastener shank, which in turn increases the length 108 over which the shank functions as a beam. The greater the beam length, the longer the moment arm over which the couple operates, and the greater the force exerted on the shank at the joint interface. Thus, the more likely the fastener is to fail.

The length of the non-prismatic shank is primarily determined by the limits to material support. The relationship at the moment of inertia to the length and penetration of the shank has been found to exist in a small boundary where the initial joint couple was created. As the magnitude of the couple increases, more parent material is affected and the resistive bond of the material, such as wood, is destroyed. When the destruction reaches a certain distance beyond the joint interface, the fastener shank deflection becomes pronounced enough to effectively cause end rotation in the shank boundary conditions, when viewed as a beam. When the parent material allows this type of end rotation, and the shank sheds end moments, there is a sudden and total failure of the connection. Thus, increases in mechanical characteristics of the shank are not significant at a distance from the joint interface where parent material fails.

In a joint experiencing lateral load, as in FIG. 10, the couple produced in the fastener shank is sustained in the parent material by the strain the parent material experiences in the vicinity of the joint interface. As a lateral load is increased, the points of maximum bending moment tend to move away from the joint interface, extending up and down the shank of the fastener. The bending moments spread away from the joint interface because the parent material undergoes increased distortion and elastic compression, which opens up the shank's hole and moves the support offered to the shank by the parent material further away from the joint. The longer unsupported area of the shank, in turn, increases the bending moment it experiences, which increases the load upon the parent material as the shank attempts to counteract the greater end moments. At the point the parent material can no longer support the increased bending moment, the parent material fails in plastic deformation. The end conditions in the fastener shank which were effectively resisting end moments become simple supports, where the ends effectively rotate and shed the end moments. When this happens, the maximum bending moment moves back to the point where the fastener shank passes through the joint interface. Fastener failure then occurs at the joint interface.

When the fastener is bent plastically as a result of the joint couple, and the tip rotates in the parent material, the tip reaches an angle where its frictional grasp is overcome and the tip withdraws from the parent material with a uniform slippage and allows the members to separate.

In accordance with the invention, it has been determined from experimental evidence that there is a range of effect, or distance, from the joint where the greatest work is done on the shank by the parent material. Within this distance, the parent material effectively supports end moments of the shank acting as a beam, and distributes opposing loads of the joint into the fastener shank creating the couple. Accordingly, shanks in accordance with the invention have a geometry and a configuration that minimize the deformation and compaction of the parent material, in contrast to the prior art, and place the greatest cross-sectional area of the shank at the location where it is most effective, namely in proximity to the joint interface. The areas of the shank that experiences the least bending moment may have reduced cross-sectional area and reduced relative strength. The grooves and ridges, which are important elements that minimize distortion and plastic compaction adjacent to the shank, are less important in these areas and may be eliminated. By redistributing material to the areas with the highest demand for strength, a measurable increase in joint strength and ability to resist lateral forces as shear results. Contrary to the teachings and operation of prior art fasteners, fasteners in accordance with the invention increase holding power by reducing the amount of distortion of parent material and increasing proportionally the amount of parent material that affords elastic support to the shank.

Figure 12:
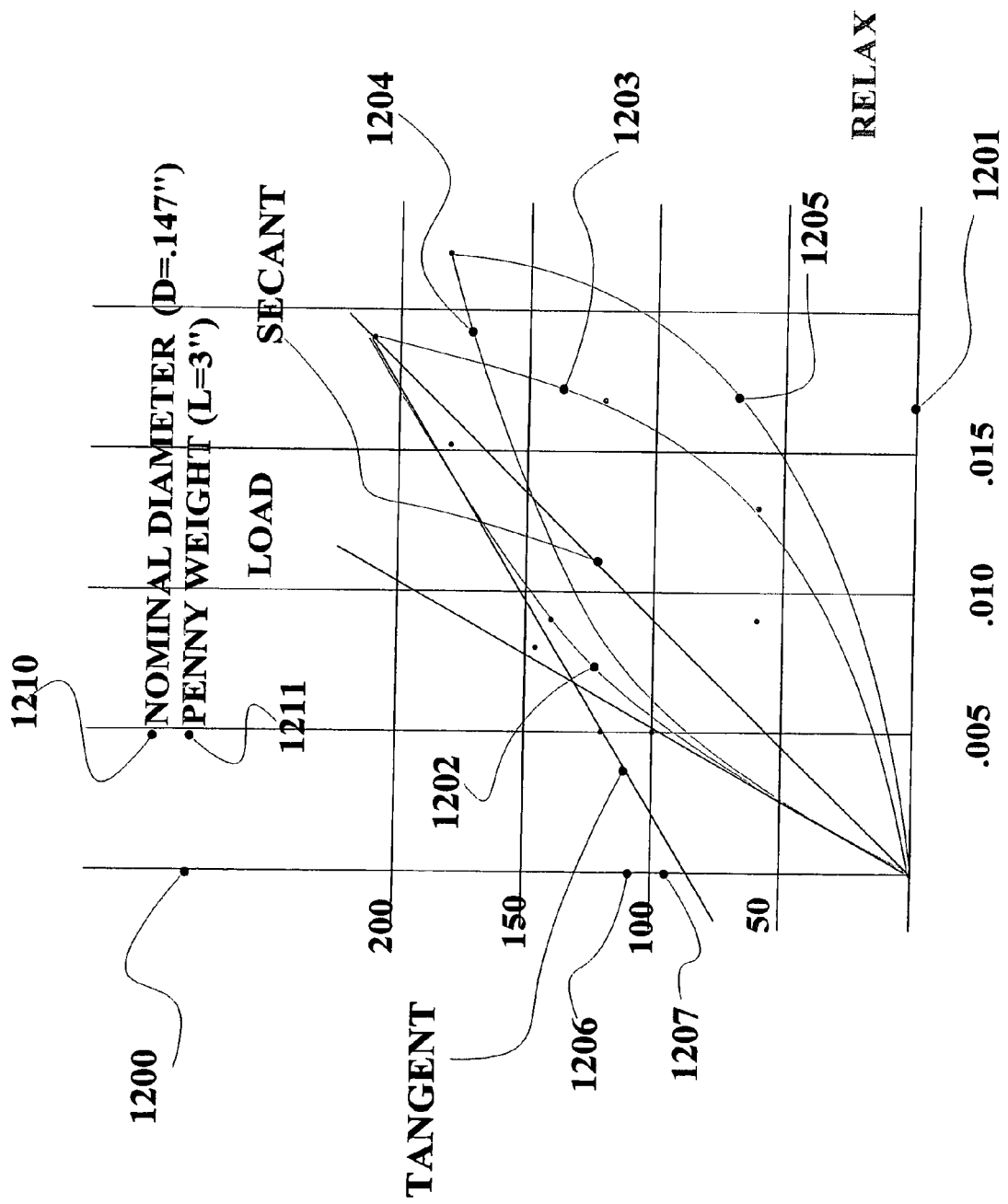
FIG. 12 shows load deflection curves illustrating the performance of a non-prismatic grooved shank fastener in accordance with the invention as compared to a standard cylindrical nail of the same nominal diameter.

FIG. 12 illustrates load-deflection curves that compare the performance of a NPGS fastener in accordance with the invention with a common prismatic cylindrical wire fastener of approximately the same nominal diameter. The curves plot load in pounds on the vertical axis 1200 versus deflection in inches on the horizontal axis 1201. The load curve 1202 is for an NPGS fastener having a nominal diameter D equal to 0.147", and a penny weight length L equal to 3". The curve of the NPGS fastener plotted in FIG. 12 is for an NPGS fastener having a configuration which is a medium between the embodiments illustrated in FIGS. 11A and 11B. The shank volume of the NPGS fastener is less than the volume of the cylindrical wire nail test sample plotted having the same diameter. Although the transverse moment of inertia of the circular cross-section wire fastener is greater than that of the NPGS shank fastener (as indicated, for example, in the Tables), the SWL for an equal joint deflection of the NPGS fastener, as shown at 1206 and determined from tests to be 108 lbs, is larger than the SWL at 95 lbs (shown at 1207) as listed by ASTM for the standard wire fastener. Since the NPGS fastener of the invention exhibits a larger SWL, and the standard wire nail moment of inertia is larger than that of the NPGS fastener, this indicates that the parent material that is subjected to strain from the invention carries a greater load with less distortion than that of the cylindrical wire nail.

FIG. 12 illustrates the performance of the fasteners when subjected to load increases, as well as to the relaxation of strain when the load is removed, as shown at 1203 for the NPGS fastener of the invention and at 1205 for the standard cylindrical wire nail. The hysteresis characteristic of these curves is because the parent material that experiences plastic/elastic deformation in load bearing applications also displays a characteristic hysteresis, where relaxation of load does not return the strain to zero. Compared to the standard cylindrical wire fastener 1204, the NPGS fastener 1202 of the invention experiences less energy loss 1203 (in ft. lbs.) than the wire fastener. The figure also illustrates a more nearly uniform distribution of load in the grooved shank of the invention than for the cylindrical wire shank, as well as a greater resistance to strain for an equivalent unit stress. This further demonstrates that elastic support in the parent material loaded by the shank is as important as the stiffness of the shank to the joint.

As seen from the foregoing, the invention affords a geometry and configuration for fastener shanks which exhibit superior performance to currently available fasteners. Moreover, as will be apparent, the geometry of a fastener shank in accordance with the invention may vary significantly from the embodiments described, and with variations in the joints to be fastened. For example, the tapered non-prismatic segments of the shank may be asymmetrical about the length of the shank, the longitudinal extent of the grooves and ridges of the shank may vary substantially depending upon materials to be fastened and may be substantially less than the length of a shank section, being located substantially just in the region of the joint(s) where the greatest stresses occur. Furthermore, NPGS fasteners in accordance with the invention exhibit not only greater lateral load handling capability, tests also demonstrate that they additionally afford greater axial holding ability and require a substantially greater withdraw force to cause joint failure. This is due to the geometry of the shank which maximizes the amount of elastic contact between the parent material and the shank, and, accordingly, affords substantially greater support to the shank which enables shanks of a given nominal diameter to handle substantially greater loads.

While the foregoing has been with respect to preferred embodiments of the invention, it will be appreciated by those skilled in the art that variations in these embodiments may be made without departing from the principles and spirit of the invention, the scope of which is defined in the appended claims.

The invention claimed is:

1. A fastener having a non-prismatic shank with an overall length L, the fastener intended for fastening elastic/plastic materials together and forming a joint for resisting lateral loads, the shank comprising;

a section extent of said shaft being located in the midsection of said length and having generally straight, longitudinally extending ridges and grooves providing a variation in strength of cross section along the length of the shank, the ridges and grooves arranged symmetrically about the circumference of the shaft, the section extent including the shaft's maximum diameter D defined between the tips of oppositely-arranged ridges, the perimeter of a circle having diameter D inscribing the ridge's tips where the diameter D is in proportion to the length L and conforms to the following expressions:

D is greater than or equal to 0.059 times L, and is less than 0.074 times L;

the maximum diameter is arranged along the midsection of the shank in such manner as to be locatable at a joint in fastened materials in its intended use, the diameter between opposite grooves defining a core diameter that is approximately 0.59 times D and which defines the central core of the shaft, the area of the central core comprising at least 44 percent of the shank total shank cross-sectional area, and wherein the cross-sectional shape of the section extent as defined by the ridges and grooves has a moment of inertia about any axis through its center that is equal at each 45 degrees rotation of the axis, the length of the section extent being equal to or greater than 55% of the shank length L, the width of the each ridge tip having a length that is not less than about 0.12 times D and not greater than about 0.3 times D, each ridge being wider at its base than at its tip, the base width being of the order 0.44 times D thereby allowing the grooves to have sufficiently wide angular opening for material displaced by the shank to elastically compress and contact the shank by entering the grooves.

2. The fastener of claim 1, wherein the tapered sides of each groove have a slope in a range of the order of 9 to 26 degrees with respect to a transverse axis of the shank, and opposite sides of the grooves conform to portions of arcs having a radius of approximately the diameter D of the midsection of the shank that subtend chords that extend from a tip of one ridge to an opposite tip of an adjacent ridge.

3. The fastener of claim 1, wherein said grooves and ridges are located in said midsection and in a portion of first and second transition sections.

4. The fastener of claim 1, wherein said midsection has a length in the range of the order of about 0.20L to 0.35L, where L is the length of the shank.

5. The fastener of claim 1, wherein the shank further has a longitudinally extending section between the grooved midsection and a pointed tip section, a portion of which naturally tapers as the grooves diminish to the pointed tip section.

6. The fastener of claim 5, wherein said midsection has a length of the order of 0.6L, and the fastener midsection having a length that is adapted to span a joint between multiple members.

7. The fastener of claim 6, wherein said midsection has a taper in the range of the order of 0 to 1 degree, and said section between the grooved midsection and the pointed tip has a taper in the range of the order of 1 to 5 degrees.

8. The fastener of claim 5, wherein the shank has another longitudinally extending section between the grooved midsection and a cylindrical section, a portion of which tapers as the grooves diminish to the cylindrical section.

9. The fastener of claim 1, wherein said grooves extend from peripheral tips of the ridges to substantially said central core, and said grooves have tapered sides conforming to portions of arcs that subtend chords that extend from a tip of one ridge to an opposite tip of an adjacent ridge, said arcs having a radius approximately equal to a diameter D of the shank.

10. The fastener of claim 9, wherein said tips of said ridges have a total peripheral length of between 15% to 38% of the linear circumference of the said circle having diameter D.

11. The fastener of claim 1, wherein said shank has a upper stem section adjacent the head, a midsection, and a tapered lower section between the midsection and the pointed tip section, at least a portion of said lower section being twisted relative to the midsection about a longitudinal axis of the shank such that the ridges form shoulders in the lower section.

12. The fastener of claim 11, wherein said lower section is twisted by an angle in the range of the order of 45 to 90 degrees.

13. The fastener of claim 12, wherein said fastener has a length sufficient to locate said twisted portion substantially beyond a joint between first and second members being joined by the fastener.

14. The fastener of claim 11, wherein said ridges and grooves in said lower section below said shoulder extend longitudinally to the region of the pointed tip section offset circumferentially by an angle from said ridges and grooves in said midsection.

15. The fastener of claim 1, wherein said section extent has a cruciform cross section comprising four longitudinally extending grooves and radially projecting ridges disposed circumferentially symmetrically about the shank.

16. A fastener having a non-prismatic shank with an overall length L, the fastener intended for fastening elastic/plastic materials together and forming a joint for resisting lateral loads, the shank comprising;

a section extent of said shaft being located in the midsection of said length and having generally straight, longitudinally extending ridges and grooves providing a variation in strength of cross section along the length of the shank, the ridges and grooves arranged symmetrically about the circumference of the shaft, the section extent including the shaft's maximum diameter D defined between the tips of oppositely-arranged ridges, the perimeter of a circle having diameter D inscribing the ridge's tips where the diameter D is in proportion to the length L and conforms to the following expressions:

D is greater than or equal to 0.059 times L, and is less than 0.074 times L;

the maximum diameter is arranged along the midsection of the shank in such manner as to be locatable at a joint in fastened materials in its intended use, the diameter between opposite grooves defining a core diameter that is approximately 0.59 times D and which defines the central core of the shaft, the area of the central core comprising at least 44 percent of the shank total shank cross-sectional area, and each groove having a jaw opening in the angular range of 105 to 145 degrees and each groove's shape being defined by two arcs, each arc having a relatively large radius and each arc extending approximately 0.35 radians so that together, the overall shape of the groove is substantially cylindrically concave but each side of the groove is generally planar, the length of the section extent being equal to or greater than 55% of the shank length L, the width of the each ridge tip having a length that is not less than about 0.12 times D and not greater than about 0.3 times D, each ridge being wider at its base than at its tip, the base width being of the order 0.44 times D thereby allowing the grooves to have sufficiently wide angular opening for material displaced by the shank to elastically compress and contact the shank by entering the grooves.

* * * * *